(12) United States Patent
Chimamkpam

(10) Patent No.: US 9,350,274 B2
(45) Date of Patent: May 24, 2016

(54) DEVICE AND METHOD FOR HARVESTING ENERGY

(71) Applicant: Emmanuel F. C. Chimamkpam, Lynnfield, MA (US)

(72) Inventor: Emmanuel F. C. Chimamkpam, Lynnfield, MA (US)

( * ) Notice: Subject to any disclaimer, the term of this patent is extended or adjusted under 35 U.S.C. 154(b) by 299 days.

(21) Appl. No.: 14/199,916

(22) Filed: Mar. 6, 2014

(65) Prior Publication Data

US 2015/0229242 A1 Aug. 13, 2015

Related U.S. Application Data

(60) Provisional application No. 61/937,330, filed on Feb. 7, 2014.

(51) Int. Cl.
*H01L 41/113* (2006.01)
*H02N 2/18* (2006.01)

(52) U.S. Cl.
CPC ............... *H02N 2/188* (2013.01); *H02N 2/186* (2013.01)

(58) Field of Classification Search
USPC ........................................................ 310/339
See application file for complete search history.

(56) References Cited

U.S. PATENT DOCUMENTS

| | | | |
|---|---|---|---|
| 6,858,970 | B2 | 2/2005 | Malkin et al. |
| 6,984,902 | B1 | 1/2006 | Huang et al. |
| 7,173,343 | B2 | 2/2007 | Kugel |
| 2009/0026885 | A1* | 1/2009 | Lee ..................... G02B 27/646 310/328 |
| 2013/0214532 | A1* | 8/2013 | Hsu .......................... F03B 17/06 290/43 |
| 2013/0282117 | A1* | 10/2013 | Van Heugten ........ A61F 2/1624 623/6.22 |
| 2015/0083196 | A1* | 3/2015 | Gray .................... H02N 11/002 136/248 |

OTHER PUBLICATIONS

C.B. Williams et al; Analysis of a Micro-electric Generator for Microsystems; Sensors and Actuators; vol. 52, pp. 8-11; Elsevier Science S.A; Aug. 11, 1996.
P. Glynne-Jones et al; An electromagnetic Vibration-powered Generator for Intelligent Sensor Systems; Sensors and Actuators; vol. 110, pp. 344-349; Elsevier Science S.A; Sep. 15, 2003.
Paul D. Mitcheson et al; Architectures for Vibration-Driven Micropower Generators; Journal of Microelectromechancial Systems; vol. 13, No. 3; Jun. 2004.
S. Roundy et al; A Piezoelectric Vibration Based Generator for Wireless Electronics; Smart Materials and Structures; vol. 13, pp. 1131-1142; Aug. 11, 2004.

(Continued)

*Primary Examiner* — Thomas Dougherty
(74) *Attorney, Agent, or Firm* — Law Office of Ilya Libenzon

(57) ABSTRACT

A miniature energy harvesting device for producing electricity from acoustical energy, stray electromagnetic energy, noise and from energy of different anatomical motions. The device comprises a housing, a mechanical spring engaged with the housing between a static and dynamic state and a first magnet engaged with the mechanical spring. The device further comprises a conductive grid freely moveable within a cavity of the housing. The device further comprises a composite structure comprising a fixed magnet and a piezoelectric material. The composite structure is engaged with the grid and in communication with the first magnet. The first magnet and the fixed magnet apply a force upon the piezoelectric material when the mechanical spring is in the static state to produce a base voltage. Excitation of the mechanical spring causes the piezoelectric material to generate an alternating voltage output having a peak voltage greater than the base voltage.

33 Claims, 20 Drawing Sheets

(56) References Cited

OTHER PUBLICATIONS

G. Despesse et al; Fabrication and Characterization of High Damping Electrostatic Micro Devices for Vibration Energy Scavenging; DTIP of MEMS and MOEMS; Montreux, Switzerland; Jun. 2005.

S. P. Beeby et al; Energy Harvesting Vibration Sources for Microsystems Applications; Measurement of Science and Technology; vol. 17, pp. R175-R195; Institute of Physics Publishing; Oct. 26, 2006.

S. P. Beeby et al; A Micro Electromagnetic Generator for Vibration Energy Harvesting; Journal of Micromechanics and Microengineering; vol. 17, pp. 1257-1265; Institute of Physics Publishing; Jun. 5, 2007.

B.P. Mann et al; Energy Harvesting From the Nonlinear Oscillations of Magnetic Levitation; Journal of Sound and Vibration; vol. 319, pp. 515-530; Elsevier Science S.A; Jul. 11, 2008.

Paul D. Mitcheson et al; Energy Harvesting From Human and Machine Motion for Wireless Electronic Devices; Proceedings of the IEEE; vol. 96, No. 9; IEEE; Sep. 2008.

Shuxiang Dong et al; Multimodal System for Harvesting Magnetic and Mechanical Energy; Applied Physics Letters; vol. 93, pp. 103511-1 to 103511-3; American Institute of Physics; Sep. 11, 2008.

L. Gammaitoni et al; Nonlinear Oscillators for Vibration Energy Harvesting; Applied Physics Letters; vol. 94, pp. 164102-1 to 164102-3; American Institute of Physics; Apr. 22, 2009.

A. Erturk et al: A Piezomagnetoelastic Structure for Broadband Vibration Energy Harvesting; Applied Physics Letters; vol. 94, pp. 254102-1 to 254102-3; American Institute of Physics; Jun. 25, 2009.

X. Xing et al; Wideband Vibration Energy Harvester With High Permeability Magnetic Material; Applied Physics Letters; vol. 95, pp. 134103-1 to 134103-3; American Institute of Physics; Sep. 29, 2009.

M. Ferrari et al; Improved Energy Harvesting From Wideband Vibrations by Nonlinear Piezoelectric Converters; Sensors and Actuators; vol. 162, pp. 425-431; Elsevier Science SA; Jun. 9, 2010.

Lihua Tang et al; Toward Broadband Vibration-based Energy Harvesting; Journal of Intelligent Material Systems and Structures; vol. 21, pp. 1867-1897; Sage Publications; Dec. 1, 2010.

Francesco Cottone et al; Nonlinear Kinetic Energy Harvesting; The European Future Technologies Conference and Exhibition 2011; Procedia Computer Science; vol. 7, pp. 190-191, Elsevier Science S.A; 2011.

F. Cottone et al; Piezoelectric Buckled Beams for Random Vibration Energy Harvesting; Smart Material and Structures; vol. 21, pp. 035021-1 to 035021-11; IOP Publishing; Feb. 17, 2012.

I. C. Lien et al; Array of Piezoelectric Energy Harvesting by the Equivalent Impedance Approach; Smart Material and Structures; vol. 21, pp. 082001-1 to 082001-8;10P Publishing; Jul. 24, 2012.

Lihua Tang et al; A Multiple-Degree-of-Freedom Piezoelectric Energy Harvesting Model; Journal of Intelligent Material Systems and Structures; pp. 1-17; Sage Publications; Aug. 27, 2012.

R.S. Langley; A General Mass Law for Broadband Energy Harvesting; Journal of Sound and Vibration; vol. 333, pp. 927-936; Elsevier Ltd.; Nov. 1, 2013.

\* cited by examiner

DEVICE AND METHOD FOR HARVESTING ENERGY

CROSS-REFERENCE TO RELATED APPLICATIONS

This application claims priority to U.S. Provisional Application Ser. No. 61/937,330 filed on Feb. 7, 2014, now pending, which is hereby incorporated into this specification by reference in its entirety.

BACKGROUND OF THE INVENTION

Harvesting energy from sounds, human motions, stray electromagnetic signals, vibrating machines, etc. offers many advantages over other sources of energy such as solar cells that generate electrical energy from sunlight but require batteries when sunlight is not present. In the early 1900s, energy harvesters collected energy from vibration and were used as direct battery replacements in flash lights. This type of vibration energy harvester and others like it are based upon principles of transduction where a strong magnet is passed into and out of a tightly coiled wire thereby inducing a current in the coiled wire. In recent conventional devices, energy is stored in a capacitor which can be recharged several hundred thousand times to power the flash light. However, these type of conventional vibration energy harvesters have not been successful as a battery replacement in most electronic devices because of mechanical and electrical constraints. To the contrary, dependence on electronic devices powered by batteries has risen and at least over four billion people or half the world population have used batteries. This is a huge waste disposal issue and degrades the environment.

Vibration energy harvesting is promising but faces many difficulties. Challenges identified in vibration energy harvesting include: (1) a very narrow bandwidth which limits ability of a vibration energy harvester to be functional in divergent environments; (2) low power output; (3) the lack of a miniature light weight device with retained meaningful power output; and (4) how best to extract electrical power from the vibration energy harvester.

One example of a conventional vibration harvesting device is the Volture piezoelectric vibration energy harvester sold by Mide Technology Corporation, 200 Boston Ave, Suite 1000 Medford, Mass. 02155, United States of America (www.mide.com). The Volture piezoelectric energy harvester is a single cantilever beam where oscillation of the thin piezoelectric substrate causes strain thereby producing a voltage. To obtain maximum power which is in milliwatts, the Volture piezoelectric energy harvester must be tuned to match the resonant frequency of the vibrating source. Another example is the Perpetuum electromagnetic vibration energy harvester sold by Perpetuum Ltd, Epsilon House, Southampton Science Park, Southampton SO16 7NS, United Kingdom (www.Perpetuum.com). The Perpetuum electromagnetic vibration energy harvester utilizes the principles of electromagnetic induction to harvest vibrational energy at one resonant frequency to give maximum power which is also in milliwatts. Perpetuum electromagnetic vibration energy harvesters convert mechanical energy (vibration) to electrical energy via an oscillating mass (magnet) which traverses across a fixed coil creating a varying amount of magnetic flux, inducing a voltage according to Faraday's law. To maximize power output, the harvester is mechanically tuned to an optimized resonant frequency present within the application environment. To harvest at other frequencies, different device models of the Perpetuum electromagnetic vibration energy harvester are needed.

Almost all conventional vibration energy harvesters are based upon the design rules of William and Yates (C. B. Williams and R. B. Yates, "Analysis of a micro-electric generator for microsystems," Sensors Actuators Phys., vol. 52, no. 1, pp. 8-11, 1996). The rules always lead to a narrow frequency response and make it difficult to tune the frequencies at which energies are harvested. Narrow bandwidth limits an energy harvesting device to one specific frequency only, leading to difficulty in operating at any other frequency and consequently non-deployable to diverse environments and diverse sources of energy. Based on the same rules, making a device small is at the expense of efficient and useful power generation. William and Yates rules are directly dependent on effective weight (mass) of movable parts of a harvester and strongly defines linear systems, extended later to equally define nonlinear systems (R. S. Langley, "A general mass law for broadband energy harvesting," J. Sound Vib., vol 333, no. 3, pp 927-936, 2014). Microelectromechanical systems (MEMS) have been widely researched, which to-date are bound by the rules to a very low power output. On the other hand, macrosized vibration energy harvesters generate large amounts of power but many of them could be cumbersome and inconvenient as hand-held, wearable and pocketable devices. In addition, the intensity of the exciting source is required to be large enough in order excite a large sized vibration energy harvester.

The idea of introducing dynamic nonlinearities to vibration energy harvester designs was formed to address challenges facing the technology (A. Erturk, J. Hoffmann, and D. J. Inman, "A piezomagnetoelastic structure for broadband vibration energy harvesting," Appl. Phys. Lett., vol. 94, no. 25, pp 254102, 2009; F. Cottone, H. Vocca, and L. Gammaitoni, "Nonlinear Energy Harvesting," Phys. Rev. Lett., vol. 102, no. 8, pp 080601 [1-4], 2009; B. P. Mann and N. D. Sims, "Energy harvesting from the nonlinear oscillations of magnetic levitation," J. Sound Vib., vol. 319, no. 1-2, pp 515-530, 2009). Common to all the intervening ideas is the requirement for high intensity of input excitation.

Added to these challenges is the conventional requirement of impedance matching for the extraction of power from a vibration energy harvester. What works best for each specific device is often overlooked, rendering harvested extracted power inefficient.

SUMMARY OF THE INVENTION

One object of the present invention was to develop a miniature energy harvesting device for the production of electricity from acoustical energy, stray electromagnetic energy, and energy of different anatomical motions to enable cleaner technologies, cleaner environments, and reduced hazardous risks such battery use and disposal.

Another object of the present invention was to develop a miniature energy harvesting device that produced a high voltage output within wide bandwidths across both high and low frequencies so the device can be deployed in many ambient environments.

Another object of the present invention was to develop a miniature energy harvesting device having more than one voltage output.

The present invention is a miniature device for synchronous harvesting of multiple sources of energy, including anatomical motions, acoustical energy, and stray electromagnetic signals across a wide range of frequencies at wide bandwidths for the production of electrical power. In one embodiment, the device comprises a housing, a mechanical spring engaged with the housing between a static and dynamic state and a first magnet engaged with the mechanical spring. The device further comprises a conductive grid freely moveable within a cavity of the housing. The device further comprises a composite structure comprising a fixed magnet and a piezoelectric material. The composite structure is engaged with the grid and in communication with the first magnet. The first magnet and the fixed magnet apply a force upon the piezoelectric material when the mechanical spring is in the static state to produce a base voltage. Excitation of the mechanical spring causes the piezoelectric material to generate an alternating voltage output comprising a peak voltage greater than the base voltage. Unlike conventional devices, within the alternating voltage wave form produced by the device of the present invention are a series of wide bandwidths of over the linear region of the wave form and wider bandwidths of energy available over the non-linear region of the wave form. The availability of energy over both the linear and non-linear portions of the waveform at larger bandwidths makes it possible to extract significantly more useful power than conventional energy harvesters.

BRIEF DESCRIPTION OF THE DRAWINGS

The following description of the invention will be further understood with reference to the accompanying drawings, in which.

DESCRIPTION OF THE INVENTION

Figure 1:
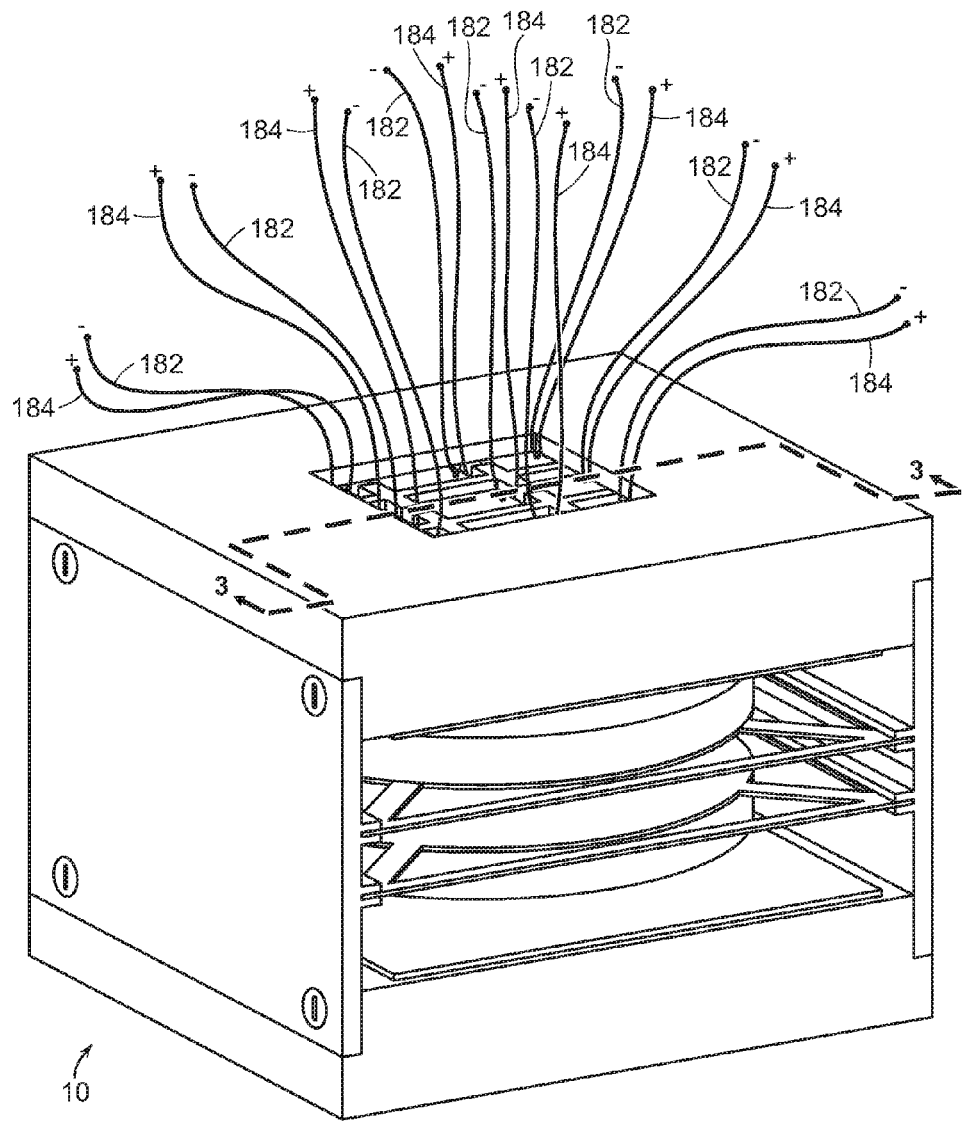
FIG. 1 is a perspective view of an energy harvesting device according to the present invention.

Referring to FIG. 1, where an energy harvesting device 10 according to the present invention is shown. Device 10 collects energy from movements, noise, sound, and stray electromagnetic signals and generates electricity. Movements can be generated from many sources such as transportation systems (for example, cars, trains, bicycles, and airplanes); infra-structures (for example, buildings, bridges, tunnels, and airports); anatomical (for example, human, animals, and plants); and machinery (for example, industrial plants, vacuum pumps, milling machines, and heavy duty vehicles). Noises can be of thermal, electromagnetic perturbations, colored noise, and white noise. Device 10 captures energy sources in the form of sinusoid, random noise, impulse and their different combinations. In the embodiment shown, device 10 has an overall length of 31 mm, a width of 24 mm, and a height of 24 mm. Unlike conventional energy harvesting devices, device 10 captures energy from movements, noise, sound, and stray electromagnetic signals and generates an alternating voltage output having wide bandwidths across an extended range of frequencies allowing more usable and flexible energy extraction in many different types of environments and/or applications.

Figure 2:
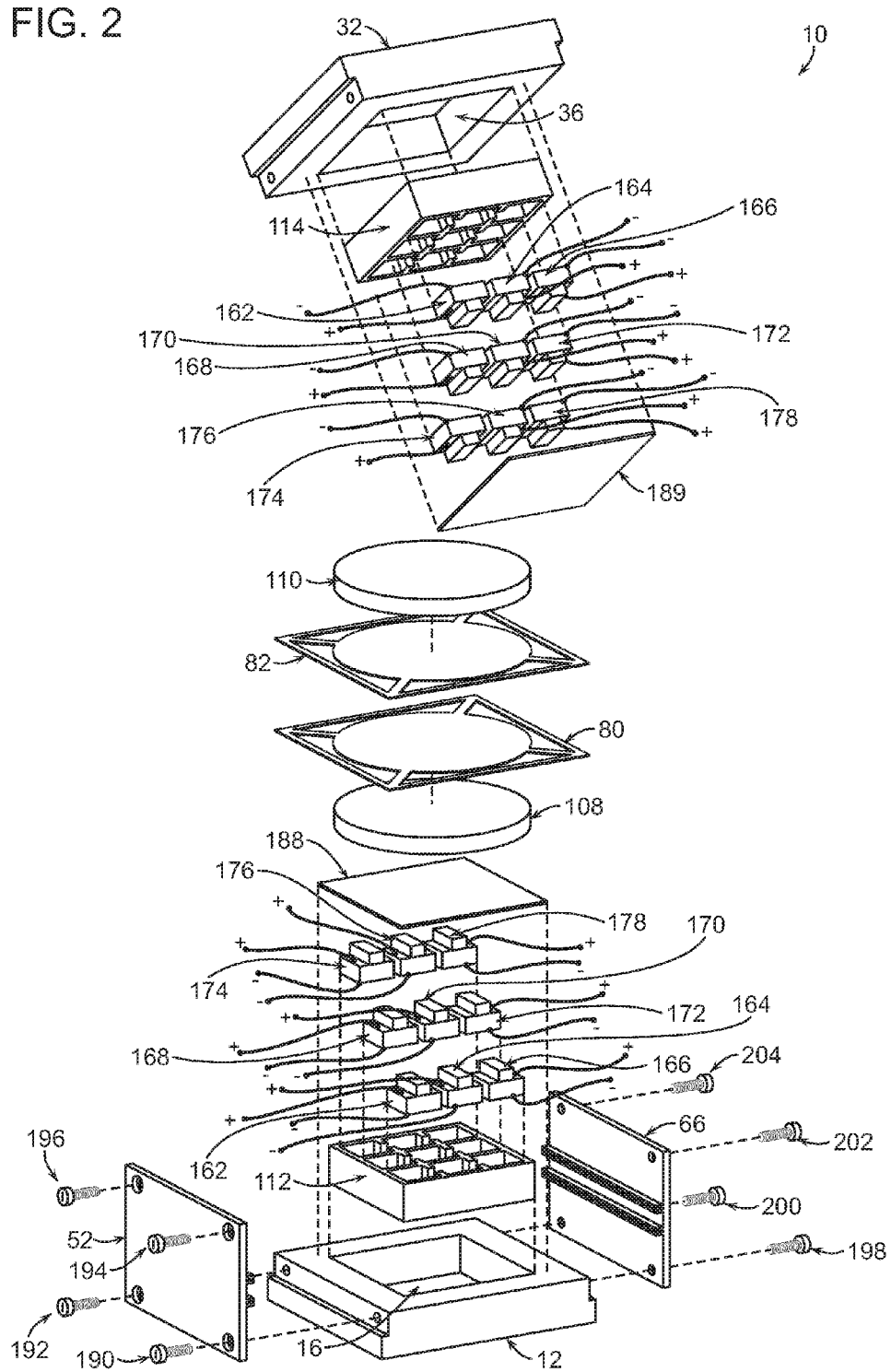
FIG. 2 is an exploded view of the device.
Figure 3:
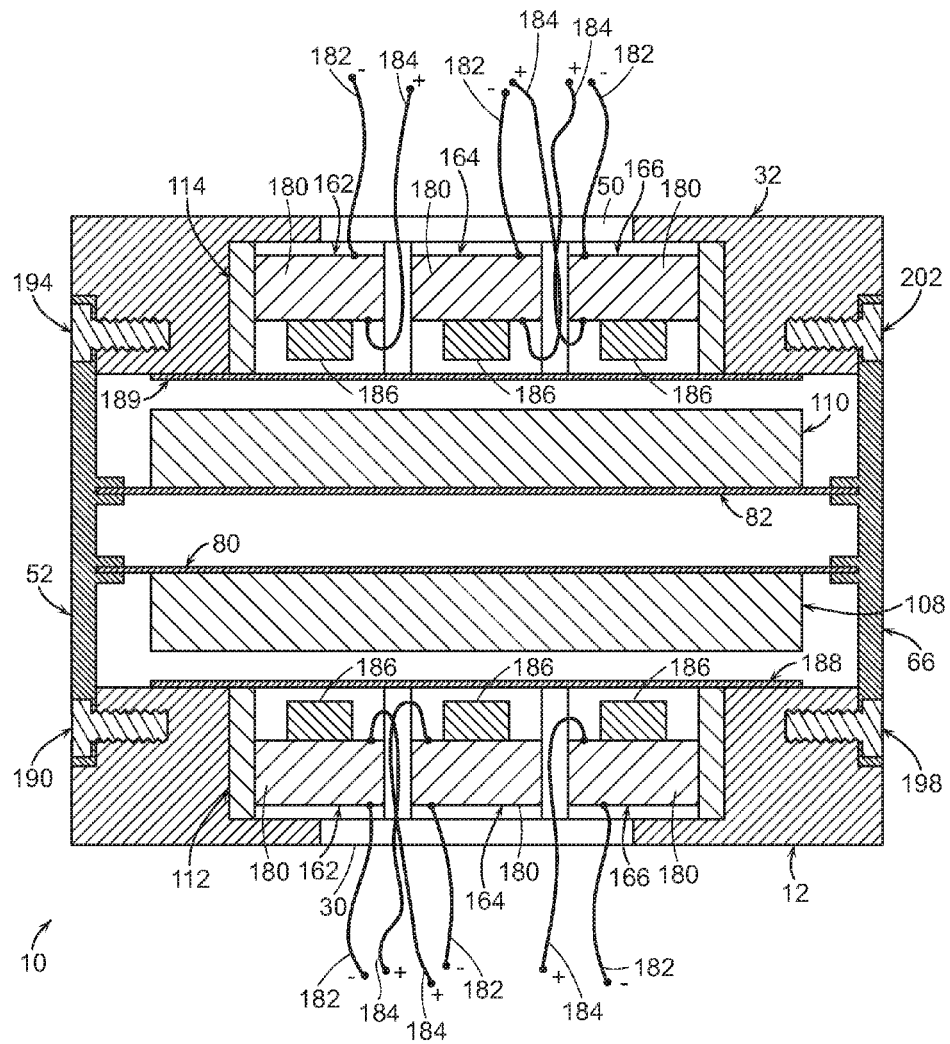
FIG. 3 is a cross section view of the device taken along line 3-3 of FIG. 2.

Referring to FIGS. 2 and 3, device 10 generally comprises a first housing 12, a second housing 32, and a left side wall 52 engaged with first and second housings 12 and 32 by fasteners such as bolts 190, 192, 194, and 196, and a right side wall 66 engaged with first and second housings 12 and 32 by fasteners such as bolts 198, 200, 202, and 204. Device 10 further comprises a first mechanical spring 80 engaged with left and right sidewalls 52 and 66. Device 10 further comprises a second mechanical spring 82 engaged with left and right sidewalls 52 and 66. Device 10 further comprises a first magnet 108 engaged with first mechanical spring 80 and a second magnet 110 engaged with second mechanical spring 82. Device 10 further comprises first and second grids 112 and 114 freely engaged with first and second housings 12 and 32, respectively. Device 10 further comprises composite structures 162, 164, 166, 168, 170, 172, 174, 176, and 178 securely disposed within cavities (to be described) of first and/or second grids 112 and 114. Device 10 further comprises one or more pieces of a non-conductive tape 188 applied to and substantially covering the entire inner face of first housing 12 so that first grid 112 may freely move within a cavity 16 (to be described) of first housing 12. Similarly, device 10 further comprises a second piece of non-conductive tape 189 applied to and substantially covering the inner face of second housing 32 so that second grid 114 may freely move within a cavity 36 (to be described) of second housing 32. Wires 182 and 184 of composite structures 162, 164, 166, 168, 170, 172, 174, 176, and 178 pass thru openings 30 and 50, of first and second housings 12, and 32, respectively.

In the static state, first magnet 108 and fixed magnets 186 (to be described) of composite structures 162, 164, 166, 168, 170, 172, 174, 176, and 178 embedded within first housing 12 repel each other applying a force upon piezoelectric blocks 180 (to be described) of composite structures 162, 164, 166, 168, 170, 172, 174, 176, and 178, producing an alternating base voltage across wires 182 and 184 of piezoelectric blocks 180. Similarly, second magnet 110 and fixed magnets 186 (to be described) of composite structures 162, 164, 166, 168, 170, 172, 174, 176 embedded with second housing 32 repel each other applying a force upon piezoelectric blocks 180 (to be described) of composite structures 162, 164, 166, 168, 170, 172, 174, 176, and 178, producing an alternating base voltage across wires 182 and 184 of piezoelectric blocks 180. Excitation of first spring 80 causes oscillation of first magnet 108 to and from the fixed magnets of composite structures 162, 164, 166, 168, 170, 172, 174, 176, and 178 embedded within first housing 12 creating an alternating high voltage across wires 182 and 184 of piezoelectric blocks 180 of composite structures 162, 164, 166, 168, 170, 172, 174, 176, and 178 within wide bandwidths. Similarly, excitation of second spring 82 causes oscillation of second magnet 110 to and from the fixed magnets 186 of composite structures 162, 164, 166, 168, 170, 172, 174, 176, and 178 embedded within second housing 32 creating an alternating high voltage across wires 182 and 184 of a piezoelectric blocks 180 of composite structures 162, 164, 166, 168, 170, 172, 174, 176, and 178 within wide bandwidths. Unlike conventional energy harvesting devices, device 10 produces a high output voltage over wide bandwidths thereby making its dramatically easier to extract energy from device 10 using presently and/or futurely developed conventional circuit designs. Further, unlike conventional energy harvesting devices, within frequencies greater than 50 Hz, device 10 has unexpected results, namely, non-linear characteristics between different configurations of device 10 thereby allowing each configuration to provide a different voltage level and energy to be exacted from device 10.

Figure 4:
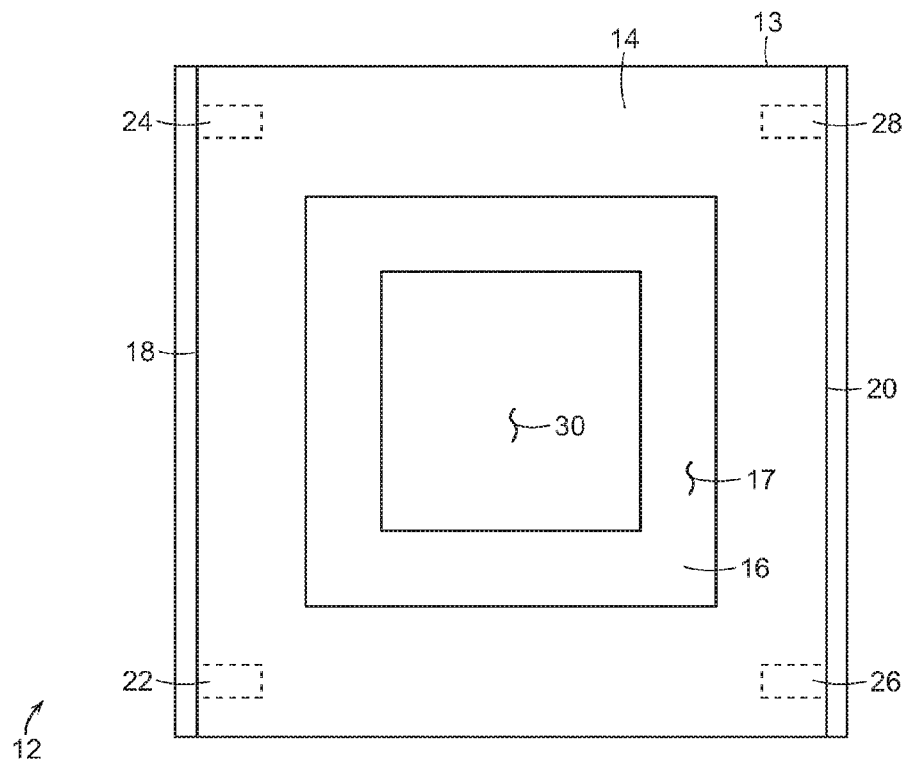
FIG. 4 is a top view of a first housing according to the present invention.
Figure 5:
FIG. 5 is a left side view of the first housing.
Figure 6:
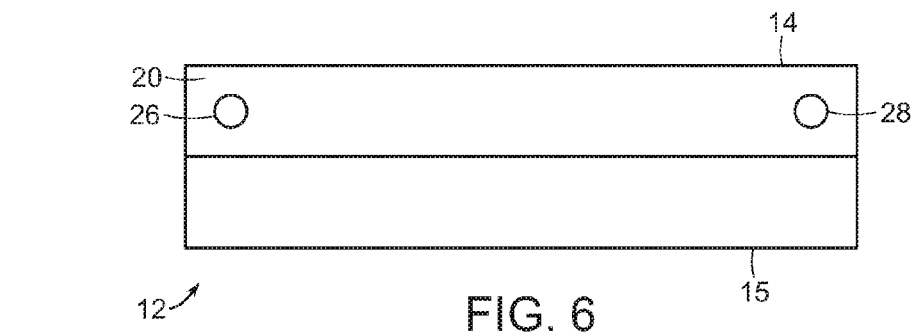
FIG. 6 is a right side view of the first housing.

Referring to FIGS. 4-6, first housing 12 comprises a base 13 having inside and outside surfaces 14 and 15, an end portion 18, and an end portion 20. First housing 12 further comprises threaded holes 22 and 24 formed at end portion 18. First housing 12 further comprises threaded holes 26 and 28 formed at end portion 20. First housing 12 further comprises a cavity 16 disposed within base 14 having a floor 17. In the embodiment shown, cavity 16 has a width of 20 mm, a length of 20 mm, and a depth of 5 mm. As will be described more fully herein, first grid 112 can freely move within cavity 16 in all directions to add vibrational energy to device 10 for harvesting. First housing 12 further comprises an opening 30 disposed in floor 17 of cavity 16. As will be described more fully herein, opening 30 is provided so that wires 182 and 184 (to be described) from composite structures 162, 164, 166, 168, 170, 172, 174, 176, and 178 of first grid 112 can pass outside of device 10 for connection to external circuitry to extract the energy from device 10. In the embodiment shown, first housing 12 is made from a highly conductive material such as copper, stainless steel, or graphene. First housing 12 may be fabricated by conventional machining processes.

Figure 7:
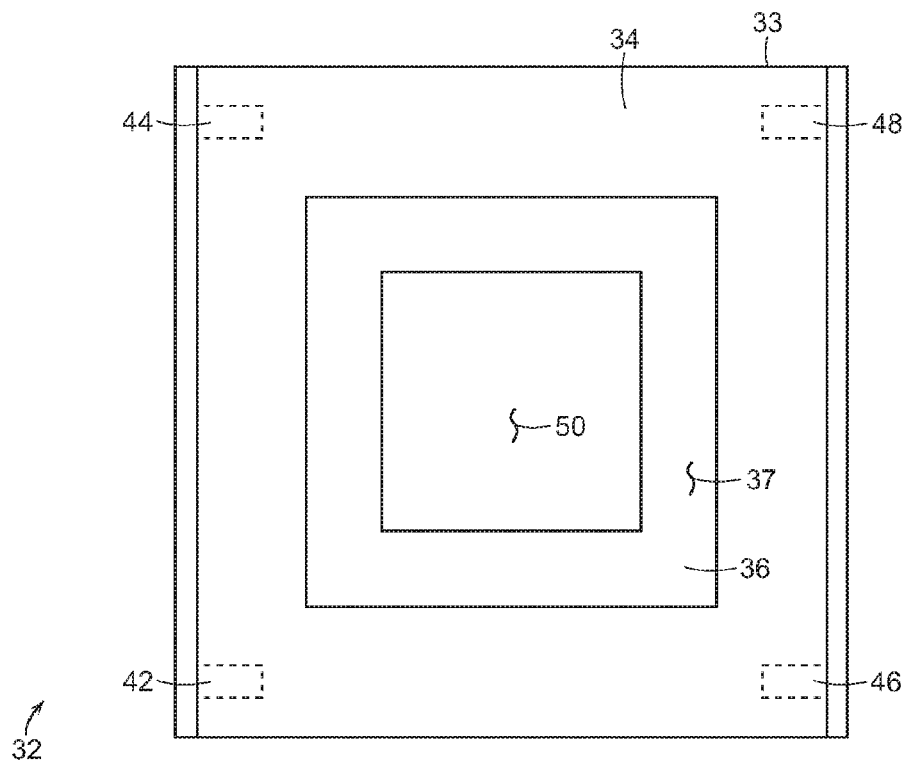
FIG. 7 is a top view of a second housing according to the present invention.
Figure 8:
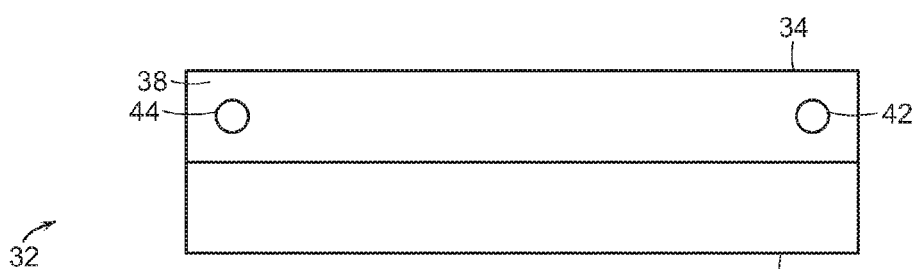
FIG. 8 is a left side view of the second housing.
Figure 9:
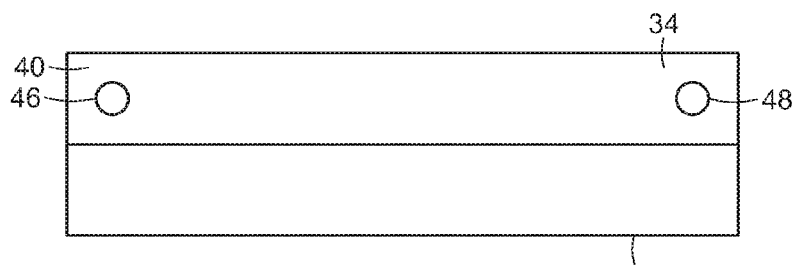
FIG. 9 is a right side view of the second housing.

Referring to FIGS. 7-9, second housing 32 is identical to first housing 12. Second housing 32 comprises a base 33 having inside and outside surfaces 34 and 35, an end portion 38, and an end portion 40. Second housing 32 further comprises threaded holes 42 and 44 formed at end portion 38. Second housing 32 further comprises threaded holes 46 and 48 formed at end portion 40. Second housing 32 further comprises a cavity 36 disposed within base 34 having a floor 37. In the embodiment shown, cavity 36 has a width of 20 mm, a length of 20 mm, and a depth of 5 mm. As will be described more fully herein, second grid 114 can freely move within cavity 36 in all directions to add vibrational energy to device 10 for harvesting. Second housing 32 further comprises a central opening 50 disposed in floor 37 of cavity 36. As will be described more fully herein, opening 50 is provided so that wires 182 and 184 from composite structures 162, 164, 166, 168, 170, 172, 174, 176, and 178 of second grid 114 can pass outside of device 10 for connection with external circuitry to extract the energy from device 10. In the embodiment shown, second housing 32 is made from a highly conductive material such as copper, stainless steel, or graphene. Second housing 32 may be fabricated by conventional machining processes.

Figure 10:
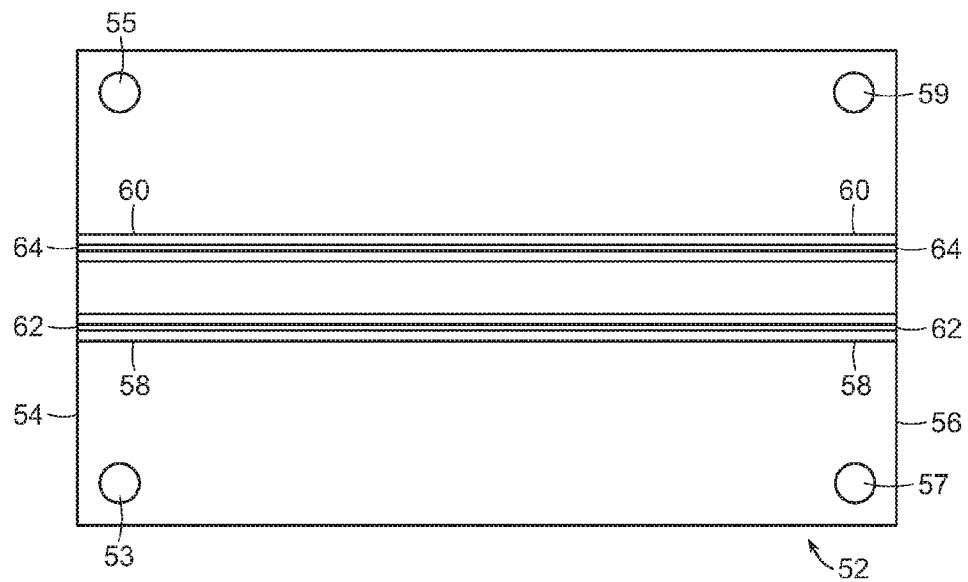
FIG. 10 is a top view of a left sidewall according to the present invention.
Figure 11:
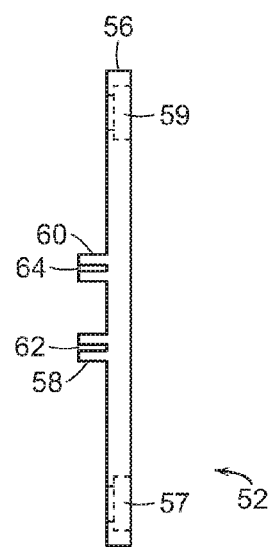
FIG. 11 is a side view of the left sidewall housing.

Referring to FIGS. 10-11, left side wall 52 comprises an end portion 54 and an end portion 56. Left side wall 52 further comprises a lower boss 58 extending from end portion 54 to end portion 56. Left side wall 52 further comprises an upper boss 60 extending from end portion 54 to end portion 56. Left side wall 52 further comprises a lower channel or slot 62 formed in lower boss 58 extending from end portion 54 to end portion 56. Left side wall 52 further comprises an upper channel or slot 64 formed in upper boss 60 extending from end portion 54 to end portion 56. As will be described more fully herein, lower slot 62 is adapted to removably engage and receive first mechanical spring 80. Similarly, upper slot 64 is adapted to removably engage and receive second mechanical spring 82. Left side wall 52 further comprises threaded holes 53 and 55 disposed at end portion 54 to receive bolts 190 and 192. Left side wall 52 further threaded holes 57 and 59 disposed at end portion 56 to receive bolts 194 and 196. In the embodiment shown, left side wall 52 has a thickness of 1 mm, lower and upper bosses 58 and 60 have a depth of 1 mm, and lower and upper slots 62 and 64 have a depth of 1 mm. In the embodiment shown, left sidewall 52 is made from a highly conductive material such as copper, stainless steel, or graphene. Left side wall 52 may be fabricated by conventional machining processes.

Figure 12:
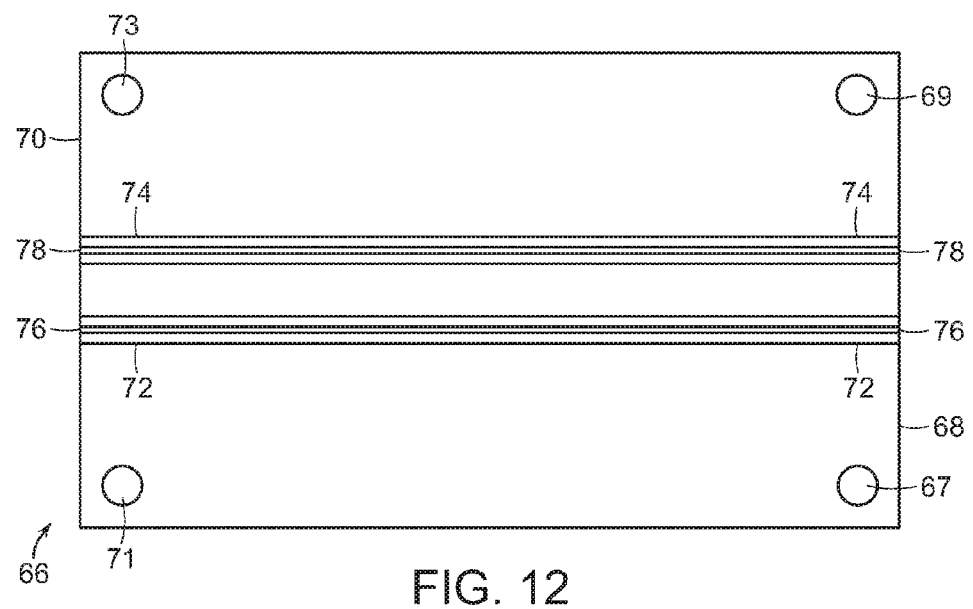
FIG. 12 is a top view of a right sidewall according to the present invention.
Figure 13:
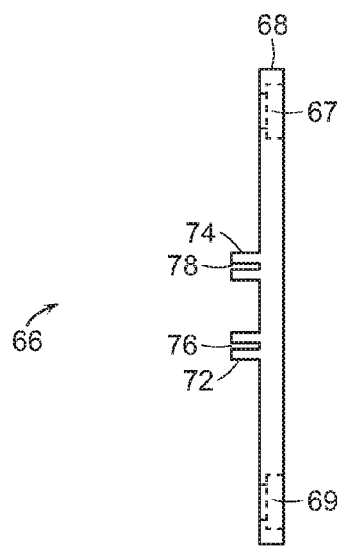
FIG. 13 is a side view of the right sidewall housing.

Referring to FIGS. 12-13, right side wall 66 is identical to left side wall 52. Right side wall 66 comprises an end portion 68 and an end portion 70. Right side wall 66 further comprises a lower boss 72 extending from end portion 68 to end portion 70. Right side wall 66 further comprises an upper boss 74 extending from end portion 68 to end portion 70. Right side wall 66 further comprises a lower channel or slot 76 formed in lower boss 72 extending from end portion 68 to end portion 70. Right side wall 66 further comprises an upper channel or slot 78 formed in upper boss 74 extending from end portion 68 to end portion 70. As will be described more fully herein, lower slot 76 is adapted to removably engage and receive first mechanical spring 80. Similarly, upper slot 78 is adapted to removably engage and receive second mechanical spring 82. Right side wall 66 further comprises threaded holes 67 and 69 disposed at end portion 68 to receive bolts 198 and 200. Right side wall 66 further comprises threaded holes 71 and 73 disposed at end portion 70 to receive bolts 202 and 204. In the embodiment shown, right side wall 66 has a thickness of 1 mm, lower and upper bosses 72 and 74 have a depth of 1 mm, and lower and upper slots 76 and 78 have a depth of 1 mm. In the embodiment shown, right side wall 56 is made from a highly conductive material such as copper, stainless steel, or graphene. Right side wall 66 may be fabricated by conventional machining processes.

Figure 14:
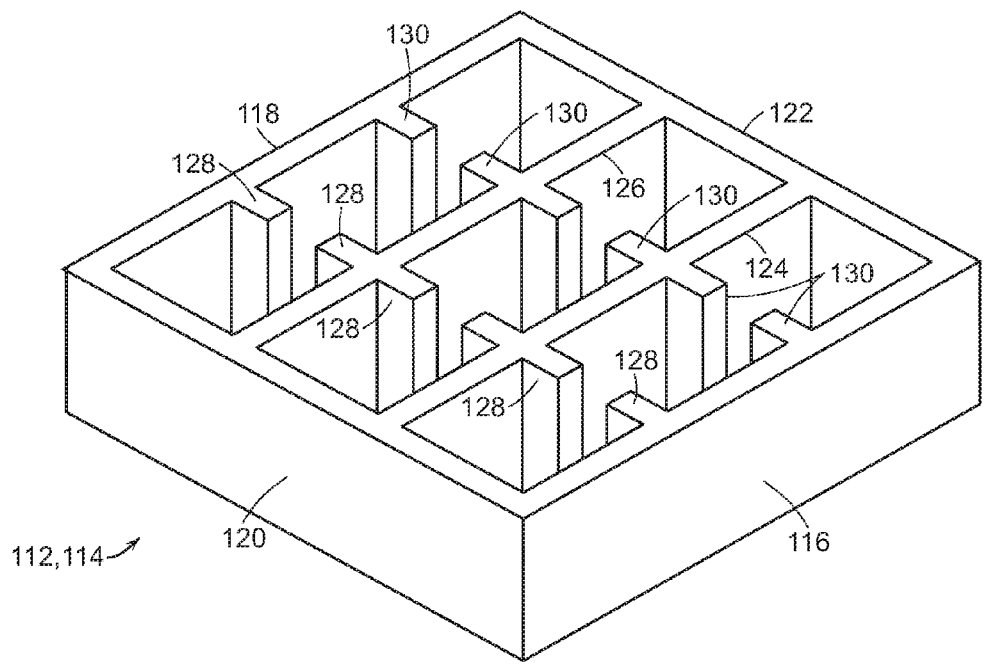
FIG. 14 is a perspective view of a grid according to the present invention.
Figure 15:
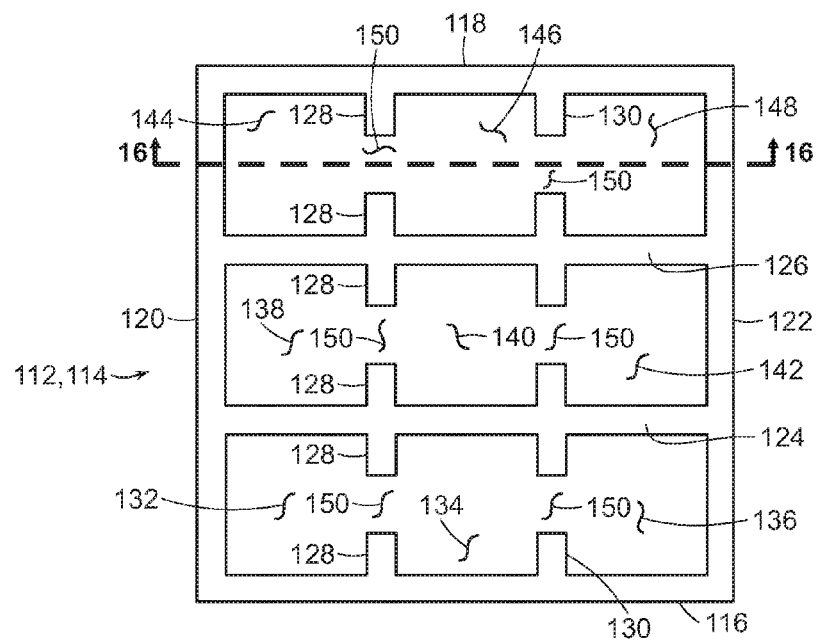
FIG. 15 is a top view of the grid.
Figure 16:
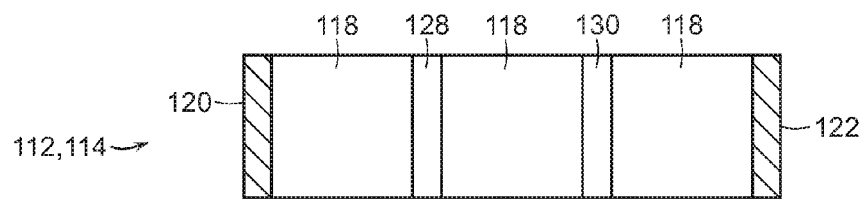
FIG. 16 is a cross-section view of the grid taken along line 16-16 of FIG. 15.

Referring to FIGS. 14-16, first grid 112 is identical to second grid 114. Each of grids 112 and 114 comprise a front wall 116, a rear wall 118, a left sidewall 120, and a right sidewall 122. Each of grids 112 and 114 further comprise an internal wall 124, an internal wall 126, and internal walls 128 and 130 that form nine (9) hollow cavities, namely, a cavity 132, cavity 134, cavity 136, cavity 138, cavity 140, cavity 142, cavity 144, cavity 146, and a cavity 148. Each of grids 112 and 114 further comprise a channel 150 formed in each of internal walls 128 and 130 forming cavity 132, 134, 136, 140, 142, 144, 146, and 148. Channels 150 of grid 112 are provided so that wires 182 and 184 (to be described) from piezoelectric block 180 (to be described) of composite structures 162, 164, 166, 168, 170, 172, 174, 176, and 178 may pass thru channels 150 of first grid 112 and out of first housing 12 for connection with external circuitry. Similarly, channels 150 of grid 114 are provided so that wires 182 and 184 (to be described) from composite structures 162, 164, 166, 168, 170, 172, 174, 176, and 178 may pass thru channel 150 of grid 114 and out of second housing 32 for connection with external circuitry. Each of grids 112 and 114 have a length of 19 mm, a width of 19 mm, and a height of 5 mm. As such, grids 112 and 114 may freely move within cavity 16 and cavity 36, respectively, by an amount equal to 1 mm. Free movement of grids 112 and 114 within cavity 16 and 36, respectively, provides an additional degrees of freedom and thus an additional mechanism to capture vibrational energy. Front wall 116, rear wall 118, left sidewall 120, and right sidewall 122 each have a thickness of 1 mm and a length of 19 mm. Internal wall 124 and internal wall 126 each have a thickness of 1 mm and extend from front wall 116 to rear wall 118. Internal wall 128 and internal wall 130 each have a thickness of 1 mm and extend from left sidewall 120 to right sidewall 122. Cavity 132, cavity 134, cavity 136, cavity 138, cavity 140, cavity 142, cavity 144, cavity 146, and cavity 148 each have a width of 5 mm, a length of 5 mm, and a height of 5 mm. In the embodiment shown, each of grids 112 and 114 is made from a highly conductive material such as copper, stainless steel, or graphene. Each of first and second grids 112 and 114 may be fabricated by conventional machining processes.

Figure 17:
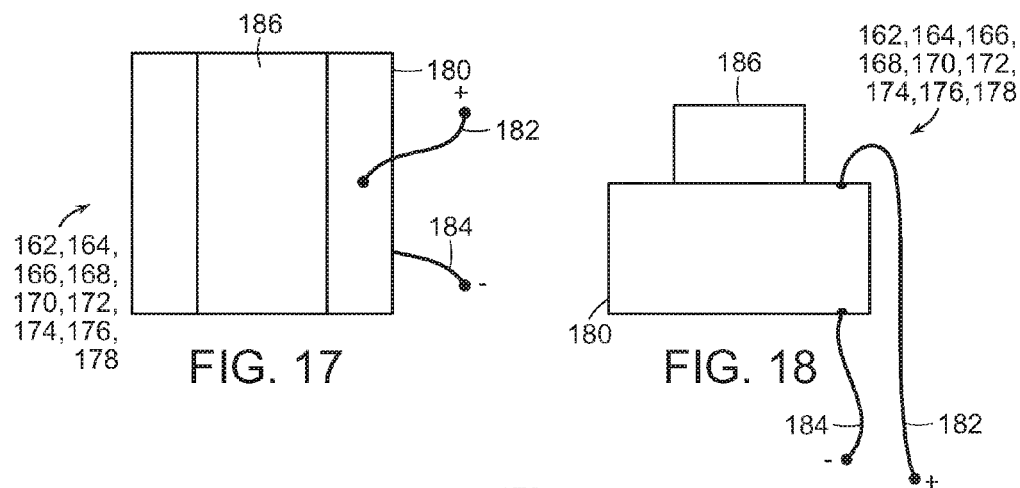
FIG. 17 is a top view of a composite structure according to the present invention having a magnet attached to a piezoelectric material.
Figure 18:
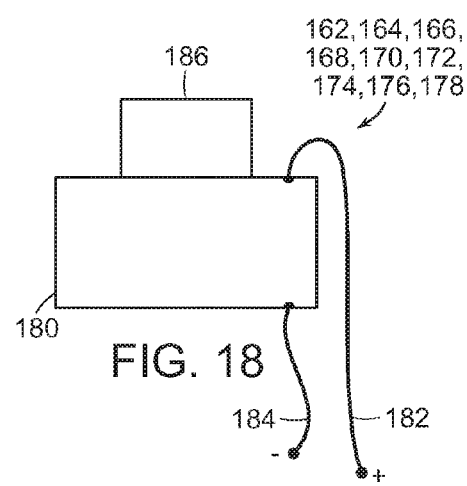
FIG. 18 is a front view of the composite structure.

Referring to FIGS. 17-18, each of composite structures 162, 164, 166, 168, 170, 172, 174, 176, and 178 are identical to each other. For ease of description, only composite structure 162 will be described. Composite structure 162 comprises a piezoelectric block 180 having a first wire 182 extending from and electrically connected to its positive face and a second wire 184 extending from and electrically connected to its negative face. Composite structure 162 further comprises a magnet 186 securely attached to the upper surface of piezoelectric block 180 by conventional means such as adhesive. Magnet 186 is centrally disposed upon and extend the entire length of piezoelectric block 180. In the embodiment shown, piezoelectric block 180 is made from a Navy Type I (PZT-4) piezoelectric material available from APC International, Ltd., P.O. Box 180, Makeyville, Pa. 17750 USA via its online store (www.americanpiezo.com) in any desired dimension. In the embodiment shown, piezoelectric block 180 has a length of 5 mm, a width of 5 mm, and a thickness of 2.0 mm. In the embodiment shown, magnet 186 is rectangular shaped 45H Neodymium magnet having a length of 5 mm, a width of 2.5 mm, a thickness of 1.5 mm, and a performance rating of 0.35 kg Pull Force and 2900 Gauss. Magnet 186 is available as Product No. MOD2-20 from MAGNET Expert Ltd., Walker Industrial Estate, Ollerton Road, Tuxford, Nottinghamshire, NG22 0PQ United Kingdom via its online store (www.first4magnet.com.).

Figure 19:
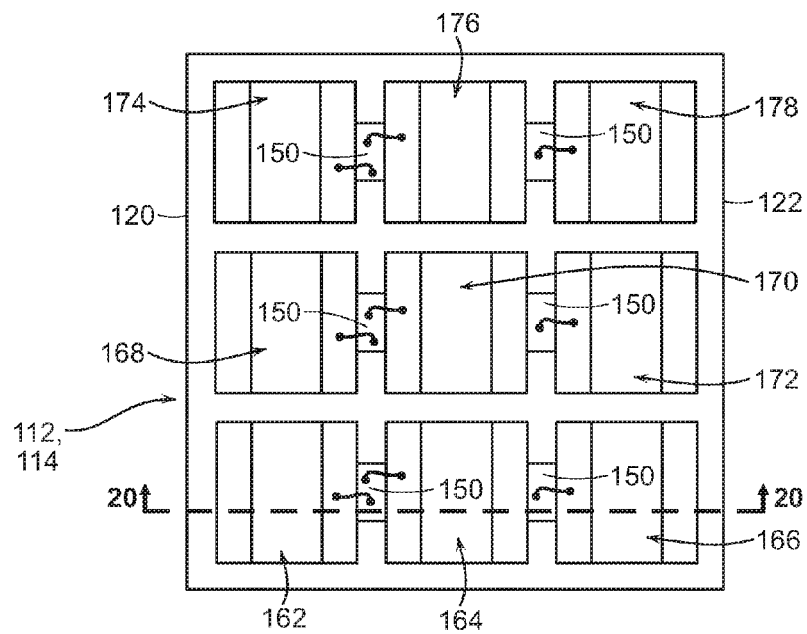
FIG. 19 is a top view of a grid according to the present invention having nine (9) cavities and a composite structure disposed in each cavity of the grid.
Figure 20:
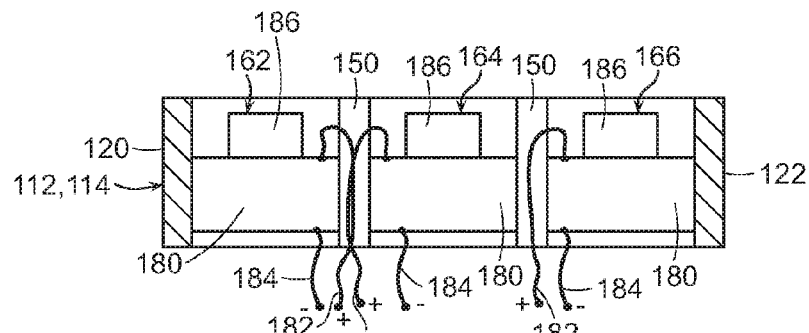
FIG. 20 is a cross section view taken along line 19-19 of FIG. 19.

Referring to FIGS. 19-20, where composite structures 162, 164, 166, 168, 170, 172, 174, 176, and 178 are shown securely disposed within cavity 132, 134, 136, 138, 140, 142, 144, 146, and 148 of first grid 112, respectively. This would be the view as the assembly of second grid 114 with composite structures 162, 164, 166, 168, 170, 172, 174, 176, and 178. As best shown by FIG. 20, wire 184 from piezoelectric block 180 of composite structure 162 passes from cavity 132 of first grid 112 thru opening 30 of first housing 12. Wire 182 from piezoelectric block 180 of composite structure 164 passes from cavity 132 thru channel 150 and outward of opening 30 of first housing 12. Similarly, wire 184 from piezoelectric block 180 of composite structure 164 passes from cavity 134 of first grid 12 thru opening 30 of first housing 12. Wire 182 from piezoelectric block 180 of composite structure 164 passes from cavity 134 of first grid 112 thru channel 150 and opening 30 of first housing 12. Similarly, wire 184 from piezoelectric block 180 of composite structure 166 passes from cavity 136 of first grid 112 thru opening 30 of first housing 12. Wire 182 from piezoelectric block 180 of composite structure 166 passes from cavity 136 of first grid 12 thru channel 150 and opening 30 of first housing 12. This cross-section view of the assembled first grid 12 is identical to assembled second grid 114 with composite structures 162, 164 and 166 securely disposed within cavity 132, cavity 134, cavity 136 of second grid 114, respectively.

Figure 21:
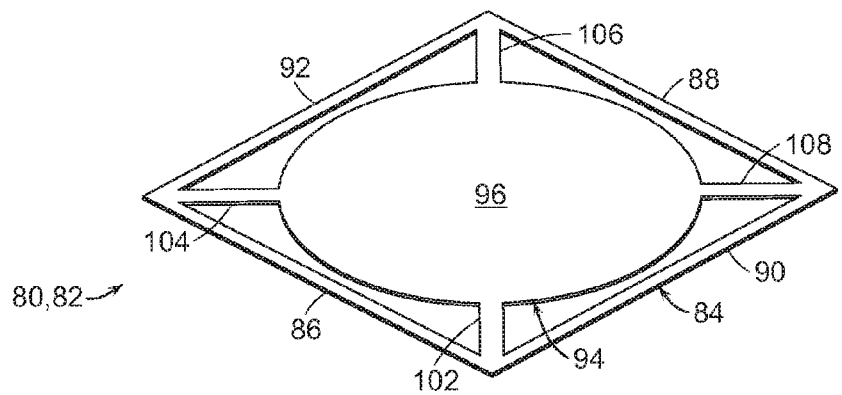
FIG. 21 is a perspective view of a first mechanical spring according to the present invention.
Figure 22:
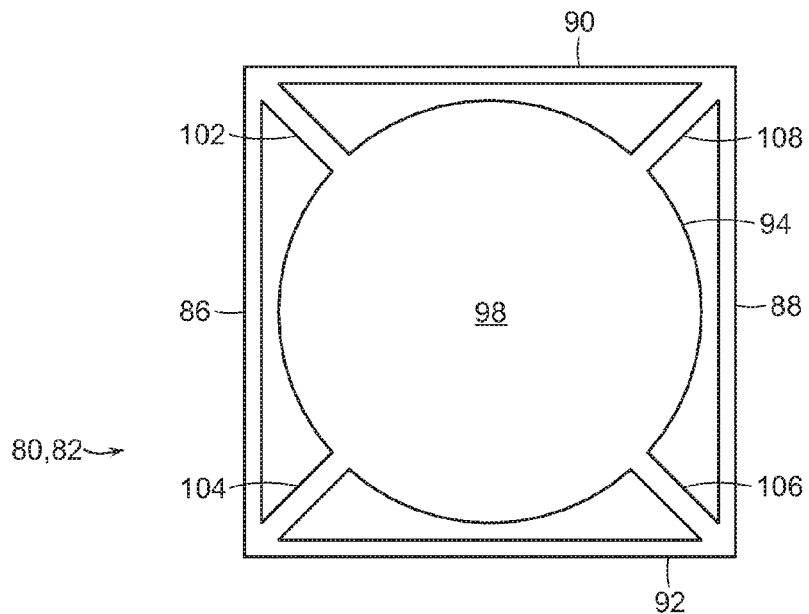
FIG. 22 is a top view of the first mechanical spring.
Figure 23:
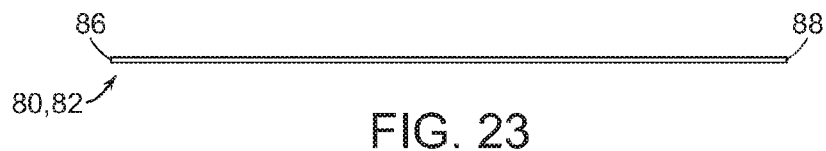
FIG. 23 is a side view of the first mechanical spring.

Referring to FIGS. 21-23, first and second mechanical springs 80 and 82 each comprise an outer body 84 having a left side portion 86, a right side portion 88, a front side portion 90, and a rear side portion 92. Each of first and second mechanical springs 80 and 82 further comprise an inner body 94 having a top surface 96 and a bottom surface 98. Inner body 94 is attached to outer body 84 by anchors 100, 102, 104, and 106. Left side portion 86 and right side portion 88 of first mechanical spring 80 removably slide within lower slot 62 of left side wall 52 and lower slot 76 of right side wall 66, respectively. Left side portion 86 and right side portion 88 of second mechanical spring 82 removably slide within upper slot 64 of left side wall 52 and upper slot 78 of right side wall 66. In the embodiment shown, inner and outer body 84 and 94, and anchors 100, 102, 104, and 106, of first and second mechanical springs 80 and 82 are made from a single piece of widely available stainless steel shim stock having a thickness of 0.20 mm. Each of anchors 100, 102, 104 and 106 have a width of 1 mm. The thickness of inner and outer body 84 and 94 and the thickness and/or width of anchors 100, 102, 104, and 106 may be varied to adjust the resonant frequency of first and/or second mechanical springs 80 and 82. Each of first and second mechanical springs 80 and 82 may be fabricated by conventional machining processes.

Figure 24:
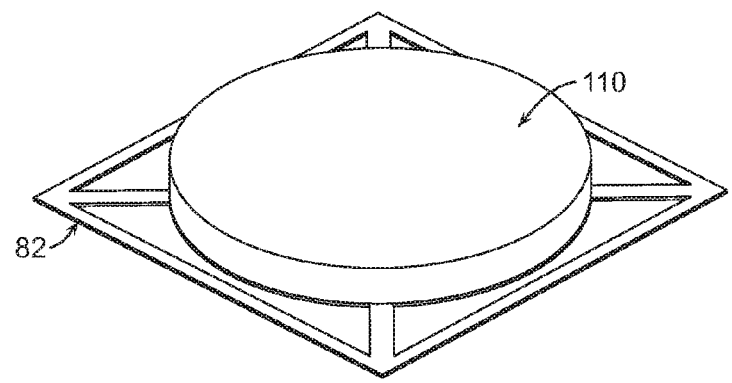
FIG. 24 is a perspective view of an assembly of the first mechanical spring and a first magnet according to the present invention.

Referring to FIG. 24, where second magnet 110 is shown removably attached to second mechanical spring 82 by conventional means such as adhesive. In the embodiment shown, first magnet 108 is identical to second magnet 110 and is secured to first mechanical spring 80 in the same manner. Each of magnets 108 and 110 are circular shaped N42 Neodymium magnet having a diameter of 25 mm, a thickness of 3 mm, and a performance rating of 5.1 kg Pull Force and 1600 Gauss. Magnets 108 and 110 are available as Product No. F253-2 from MAGNET Expert Ltd., Walker Industrial Estate, Ollerton Road, Tuxford, Nottinghamshire, NG22 0PQ United Kingdom via its online store (www.first4magnet.com.). In the embodiment shown, first magnet 108, at a static state, is spaced a distance of 1 mm from first grid 112. Similarly, second magnet 110, at a static state, is spaced a distance of 1 mm from second grid 114.

Device 10 may be assembled in different configurations depending upon the desired energy output. In a maximum power configuration, composite structures 162, 166, 168, 170, 172, 174, 176, and 178 are secured in first grid 112. Second, composite structures 162, 166, 168, 170, 172, 174, 176, and 178 are secured in second grid 114. Third, first grid 112 is freely disposed in cavity 16 of first housing 12. Fourth, second grid 114 is freely disposed in cavity 36 of second housing 32. Fifth, tape 188 is placed over first grid 112 and inside surface 14 of first housing 12 thereby preventing first grid 112 from falling out of cavity 16 of first housing 12 and composite structures 162, 166, 168, 170, 172, 174, 176, and 178 from falling out of first grid 112, thereby allowing movement of first grid 112 in all directions within cavity 16 of first housing 12. Sixth, tape 188 is placed over second grid 114 and inside surface 34 of second housing 32 thereby preventing second grid 114 from falling out of cavity 36 of second housing 32 and composite structures 162, 166, 168, 170, 172, 174, 176, and 178 from falling out of second grid 114 thereby allowing movement of second grid 114 in all directions within cavity 36 of first housing 12. Seventh, left side wall 52 is secured to end portion 18 of first housing 12 by bolts 190 and 192. Eighth, right side wall 66 is secured to end portion 20 of first housing 12 by bolts 198 and 200. Ninth, left side wall 52 is secured to end portion 38 of second housing 32 by bolts 194 and 196. Tenth, right side wall 66 is secured to end portion 40 of second housing 32 by bolts 202, and 204. Eleventh, first magnet 108 is secured to inner body 94 of first mechanical spring 80 and left and right side portions 86 and 88 of first mechanical spring 80 are inserted into lower slots 62 and 76 of left and right side walls 52 and 66, respectively. Thereafter, second magnet 110 is secured to inner body 94 of second mechanical spring 82 and left and right side portions 86 and 88 of second mechanical spring 82 are inserted into upper slots 64 and 78 of left and right side walls 52 and 66, respectively. In a full configuration, device 10 is standing up such that left side wall 52 acts as a mounting surface or free standing base for deployment in various vibrational energy environments such as direct mounting to an industrial machine or a person.

The structure of device 10 uses multiple mechanisms for the production of electricity as a hybrid of both linearity and nonlinearity such that harvested energy can be amplified or attenuated and the frequency at which energy is harvested can be shifted according to the desire of the user. Specifically, device 10 comprises at least three mechanisms for harvesting ambient energy: (1) confluence and synergy of forces wherein there is interplay of gravitational, mechanical, electrostatic and electromagnetic forces to maximize generated power and to widen bandwidth of operation; (2) direct communication between a suspended magnetic body and a composite structure comprising a magnet and a piezoelectric block; and (3) free or regulated motion of a conductor grid holding the composite of the magnet and piezoelectric structures. As will be described more fully herein, device 10 may employ another mechanism, namely, electromagnetic induction associated with a suspended helical wire (to be described).

Figure 25:
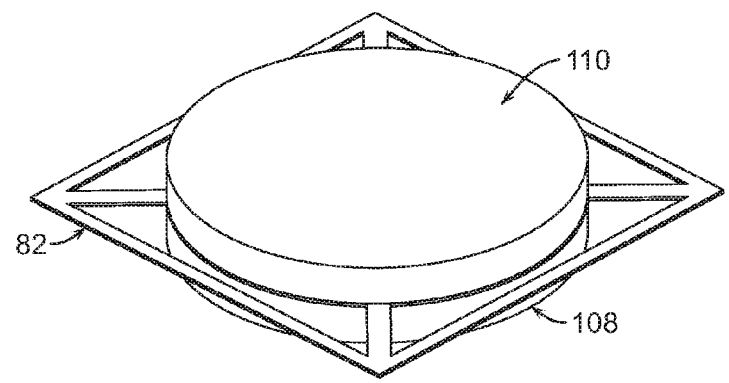
FIG. 25 is a perspective view of an assembly of the first mechanical spring and first and second magnets according to the present invention.

Referring to FIG. 25, where first and second magnets 108 and 110 are shown attached to bottom and top surfaces 98 and 96, respectively, of second mechanical spring 82. This represents another configuration of device 10 where only one mechanical spring is employed and one or more grids of composite structures. As will be described more fully herein, this double mass configuration of second mechanical spring 82 uncovered a non-linear characteristic response of device 10 above 50 Hz that is not present in conventional devices.

Figure 26:
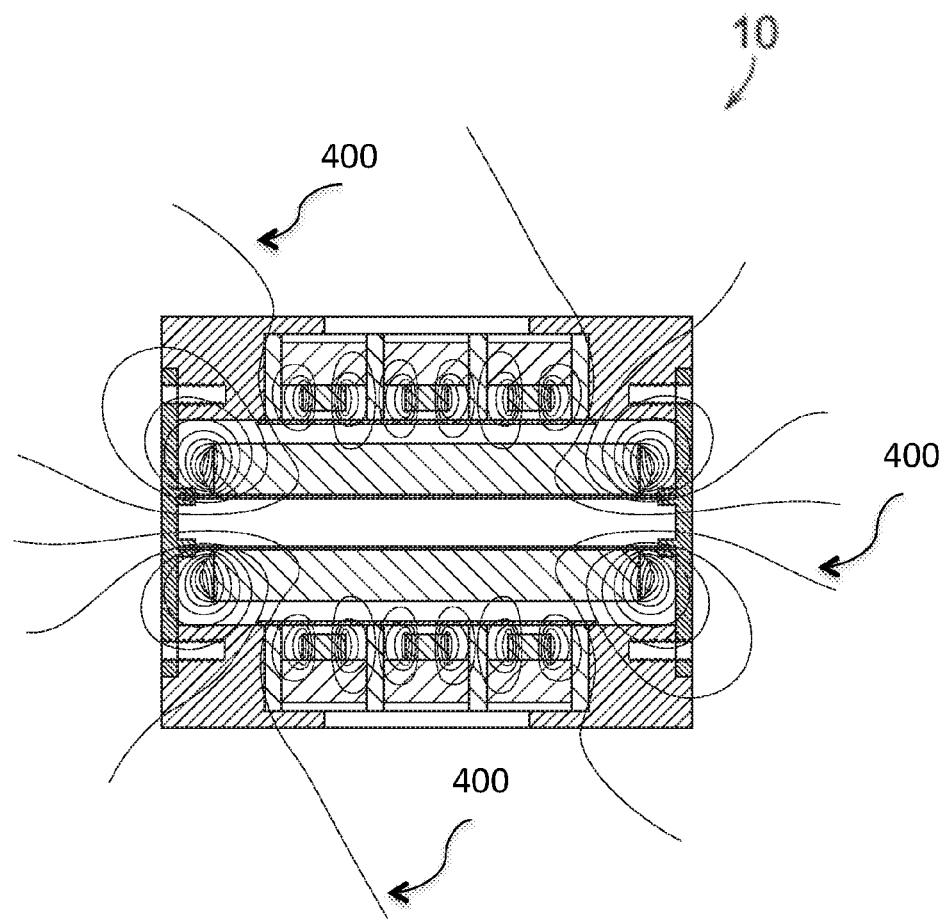
FIG. 26 is a cross section view of the device showing static magnetic energy available for electromagnetic transduction.

Referring to FIG. 26, where a cross section view of device 10 shows static magnetic energy available for electromagnetic transduction.

Figure 27:
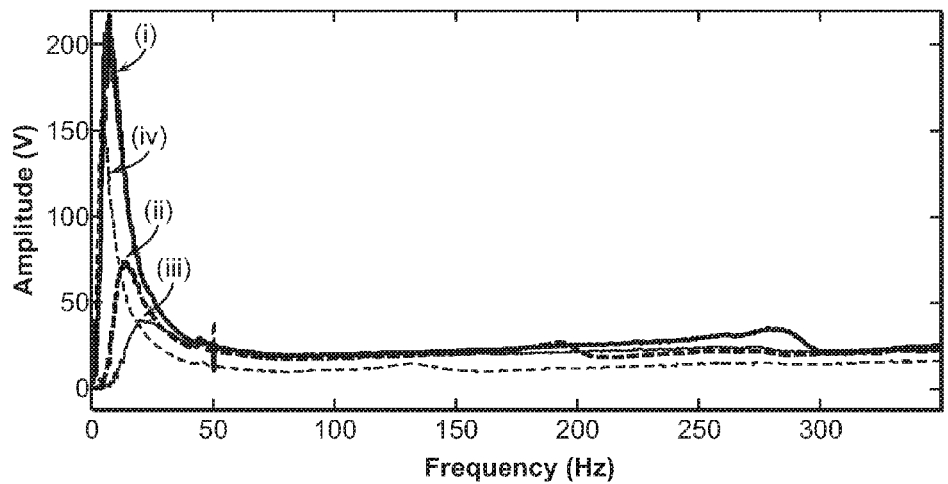
FIG. 27 is an example of real-time data from a data logger demonstrating the harvesting of energy by the device within bandwidth of 50 Hz across a frequency range up to 50 Hz from a random noise base input from a vibration shaker and the linear behavior of the device at such frequencies.
Figure 28:
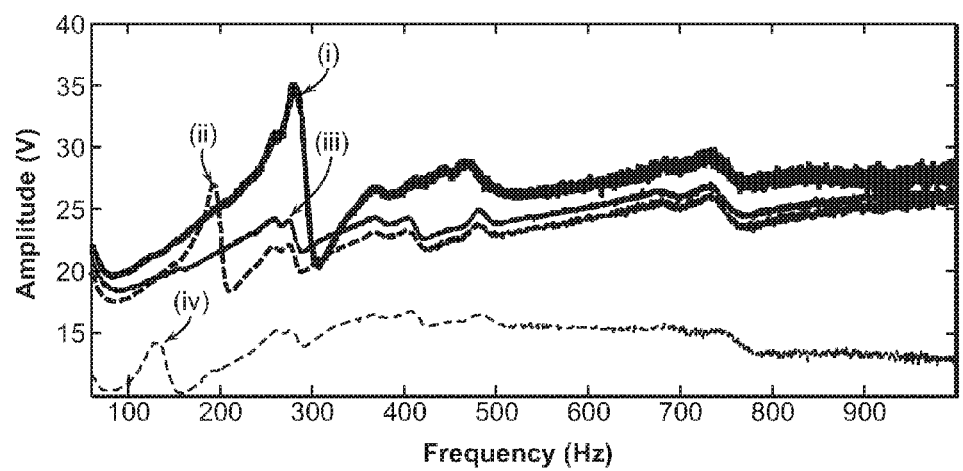
FIG. 28 is an enlarged view of the wave form of FIG. 27 demonstrating harvesting of energy by the device within wider bandwidths at frequencies above 50 Hz and the non-linear behavior of the device at such frequencies.

Referring to FIGS. 27-28, four different configurations of device 10 were tested with first housing 12 attached to a shaker table. Electrical outputs from wires 82 and 84 of three composite structures 180 of second housing 32 were connected to a data logger and the results are shown in FIGS. 27 and 28. The four different configurations are labeled and described as follows: (i) the presence of first and second magnets 108 and 110 secured to first and second mechanical springs 80 and 82, respectively; (ii) the presence of only second magnet 110 secured to second mechanical spring 82; (iii) the absence of first and second magnets 108 and 110 and first and second mechanical springs 80 and 82; and (iv) the presence of only first and second magnets 110 secured to second mechanical spring 82. In each of the above configurations, only three out of the eighteen cavities of first and second grids 110 and 112 were populated with the composite structure representing seventeen percent of the total capacity of device 10 in the piezoelectric mode. Unlike conventional energy harvesting devices, the real time data of device 10 demonstrate the harvesting of energy by device 10 in large bandwidths across wide ranges of frequencies, for example, a band width of 50 Hz at a low frequency region (FIG. 27), and significantly larger bandwidths within a frequency range of 50 Hz to 350 Hz, differing in width according to configurations (FIG. 28). Examples are given below in Tables 1 and 2 of performance parameters as extracted from FIGS. 27 and 28 for device 10 at seventeen percent (17%) of its total capacity. Circuitry for extraction of energy from the piezoelectric mode comprises high input impedance and low output impedance. Real power was dissipated across less than ten ohms.

TABLE 1

| Frequency below 50 Hz (Linear Character) | | | |
| --- | --- | --- | --- |
| Data Labels (Configuration) | Peak Frequency (Hz) | Voltage (V) | Bandwidth (Hz) |
| (i) | 7.02 | 217.44 | 50 |
| (ii) | 14.04 | 73.85 | 50 |
| (iii) | 21.97 | 41.15 | 50 |
| (iv) | 4.12 | 157.50 | 50 |

TABLE 2

Frequency above 50 Hz and below 350 Hz (Non-Linear Character)

| Data Labels (Configuration) | Peak Frequency (Hz) | Voltage (V) | Bandwidth (Hz) |
|---|---|---|---|
| (i) | 281.68 | 34.95 | 225 |
| (ii) | 193.18 | 27.02 | 127 |
| (iii) | Not Applicable | Not Applicable | Not Applicable |
| (iv) | 131.07 | 14.31 | 80 |

Unlike conventional devices, within the alternating voltage wave form produced by the device of the present invention are a series of wide bandwidths of over the linear region of the wave form and wider bandwidths of energy available over the non-linear region of the wave form. The availability of energy over both the linear and non-linear portions of the waveform at larger bandwidths makes it possible to extract significantly more useful power than conventional energy harvesters.

Figure 29:
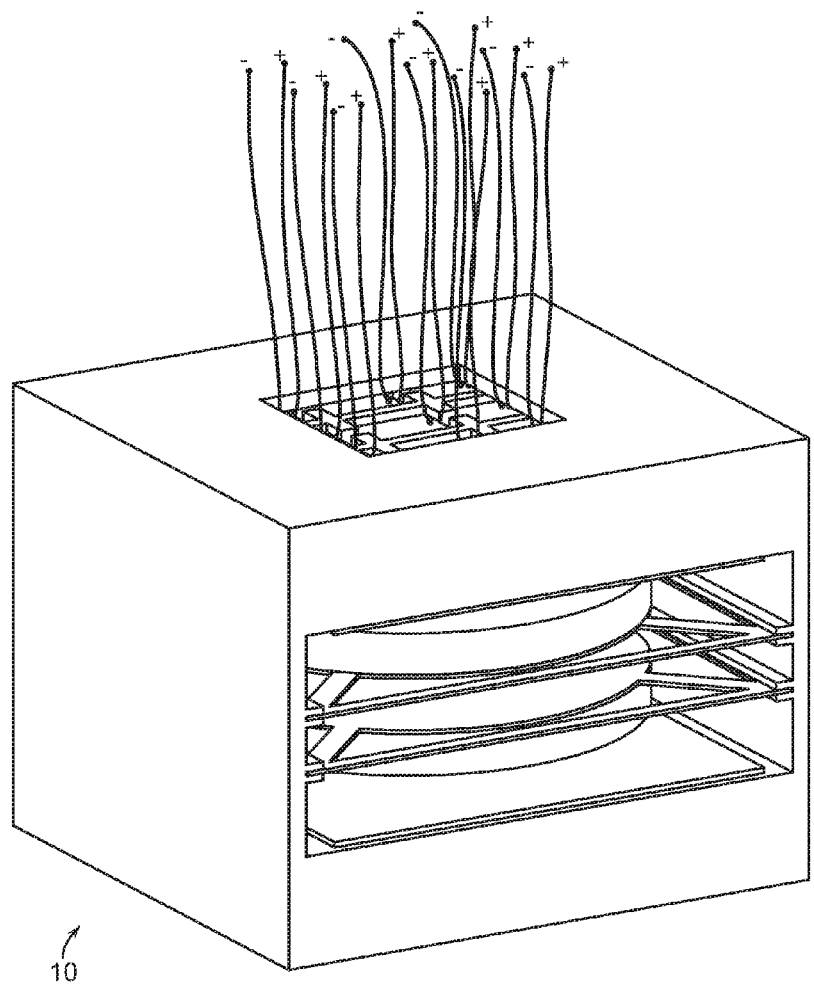
FIG. 29 is a perspective view of the device having a one-piece housing.

Referring to FIG. 29, where device 10 is shown having a one piece housing. Fabrication of a one piece housing may be accomplished by current three dimensional (3-D) printing processes or other futurely developed technologies.

Figure 30:
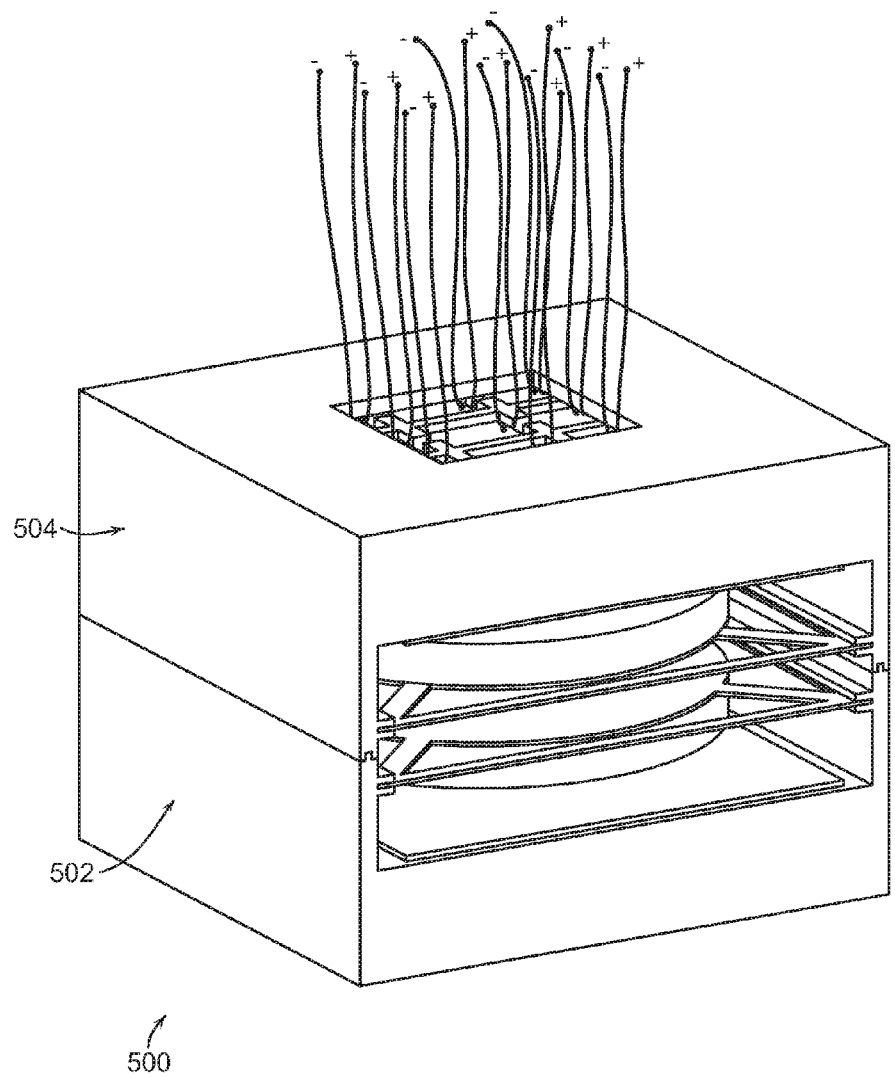
FIG. 30 is a perspective view of the device having a two-piece housing.
Figure 31:
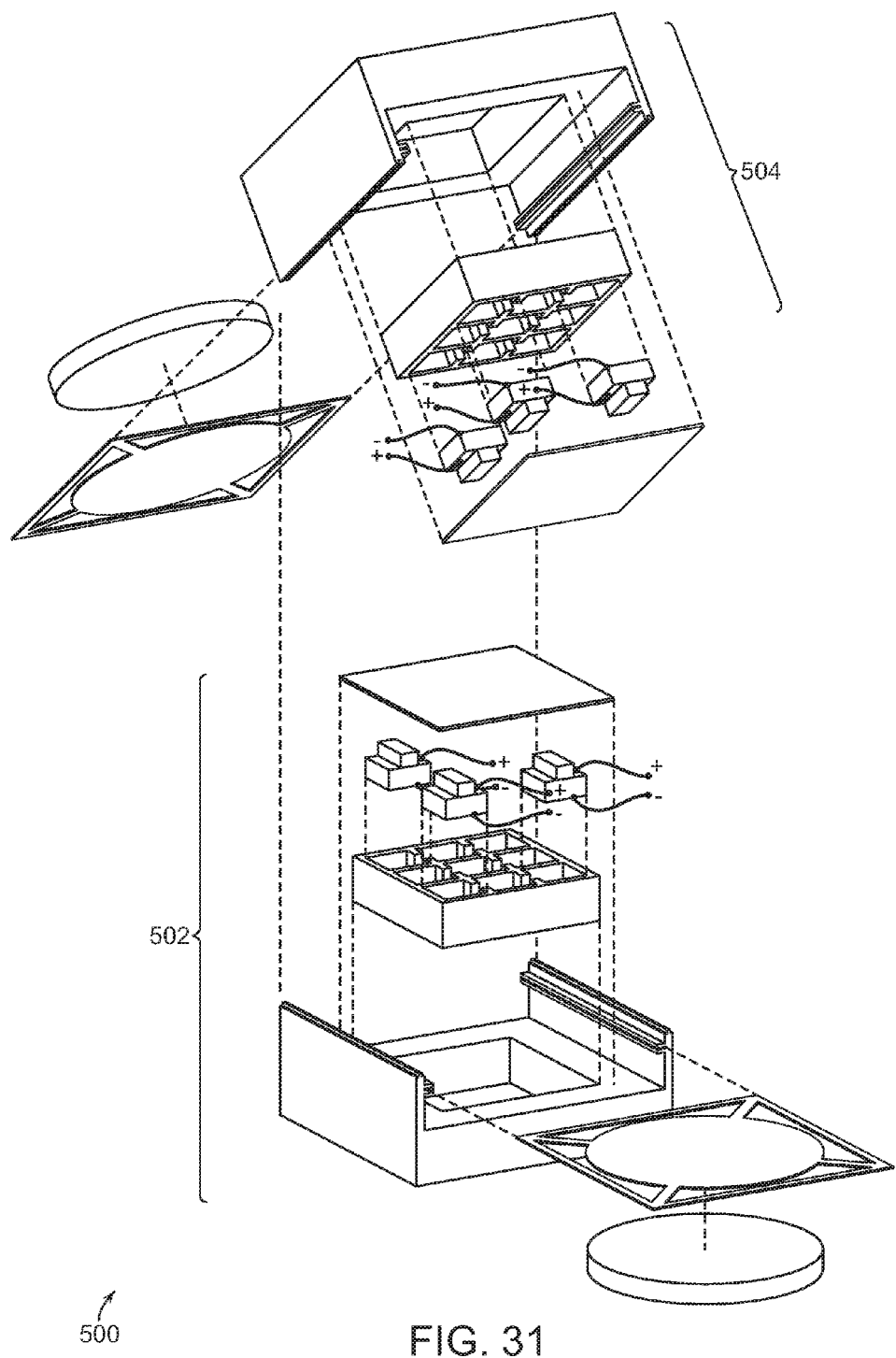
FIG. 31 is an exploded view of the device having a two-piece housing.

Referring to FIGS. 30 and 31, where a device 500 is shown having modules 502 and 504 that can be used together or separately to produce electricity. Modules 502 and 504 may be fabricated by conventional machining processes or three dimensional (3-D) printing processes.

Figure 32:
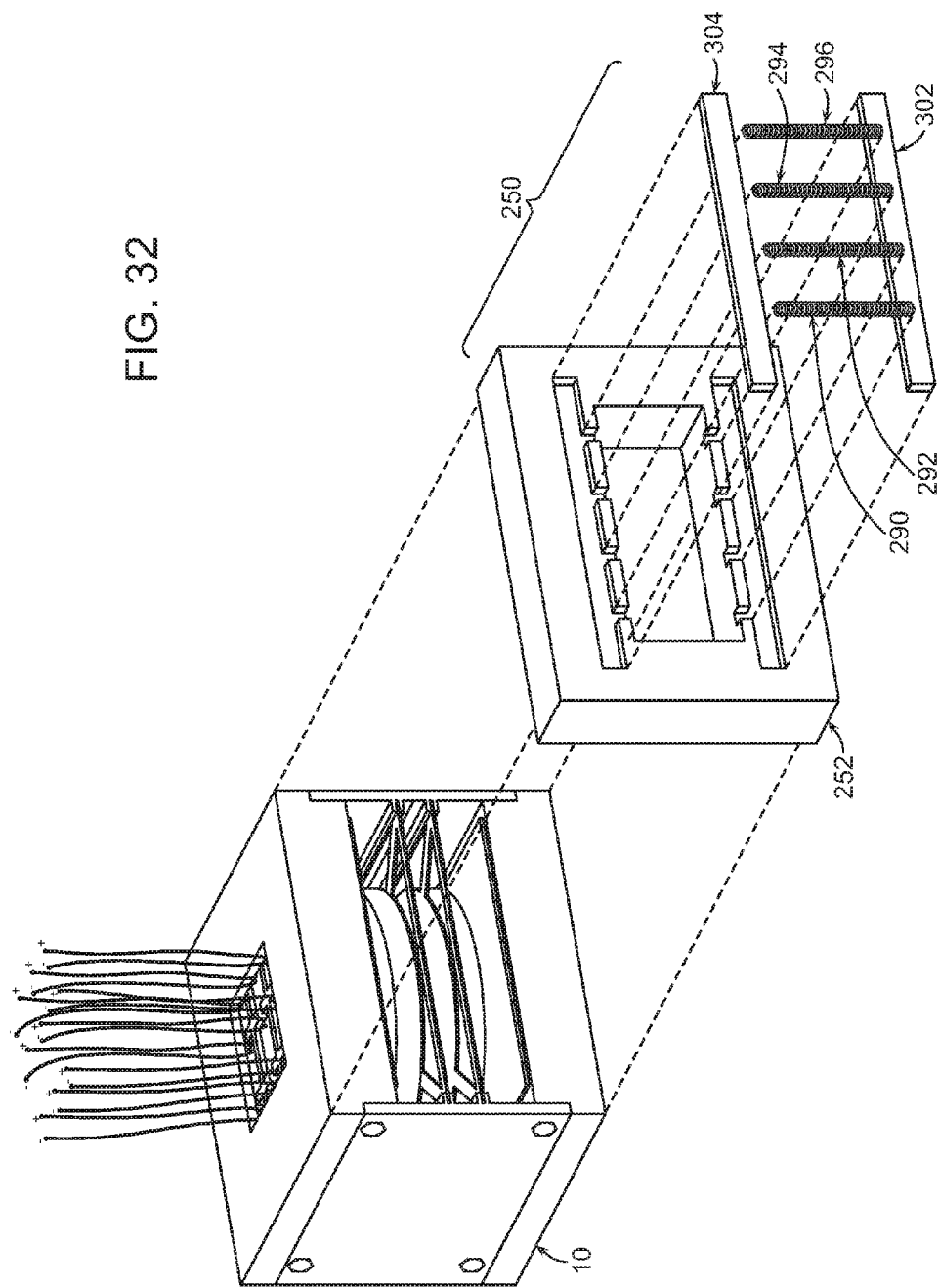
FIG. 32 is a perspective exploded view of a conductor panel assembly according to the present invention removably mounted to an open side of the device for harvesting energy from electromagnetic transduction to provide a second and independent source of harnessed energy.
Figure 33:
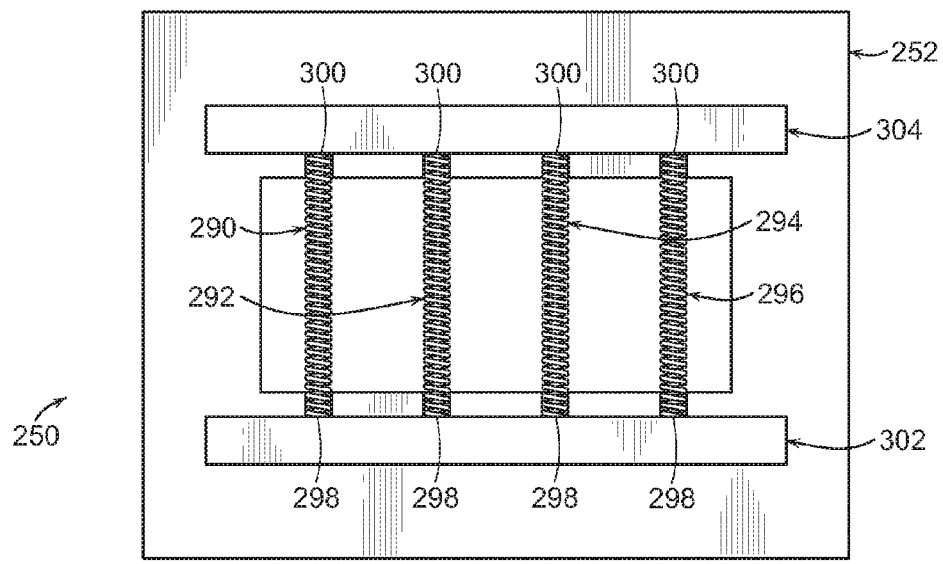
FIG. 33 is a front view of the conductor panel assembly.
Figure 34:
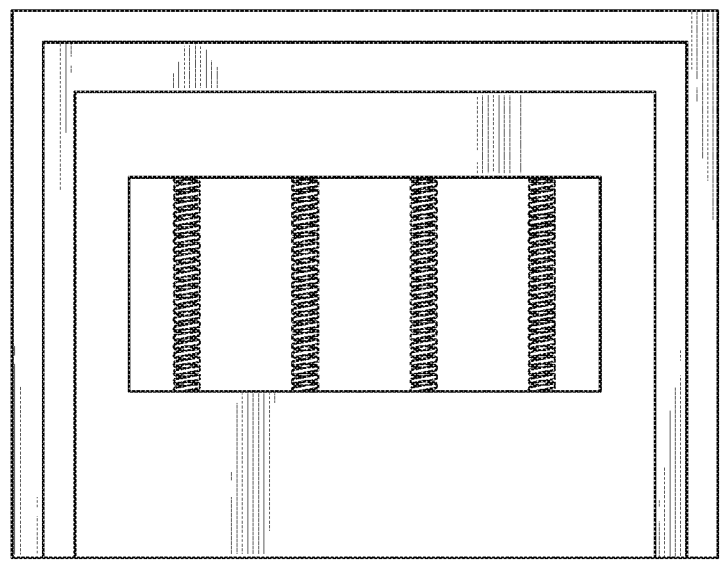
FIG. 34 is a rear view of the conductor panel assembly.
Figures 35, 36:
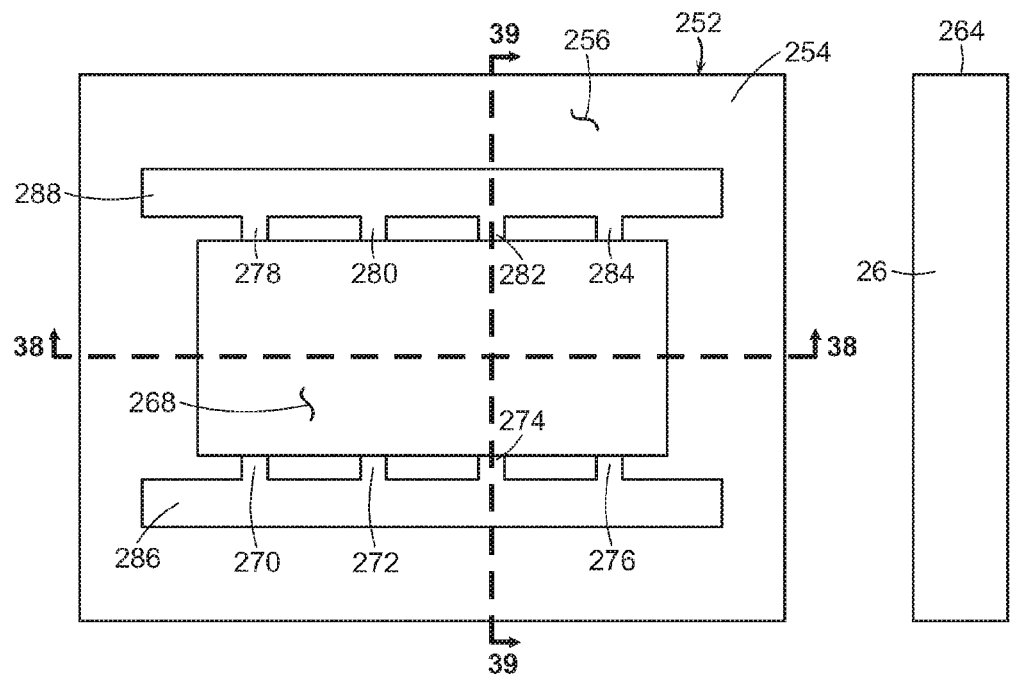
FIG. 35 is a front view of a frame of the conductor panel assembly.
FIG. 36 is a side view of the frame.
Figure 37:
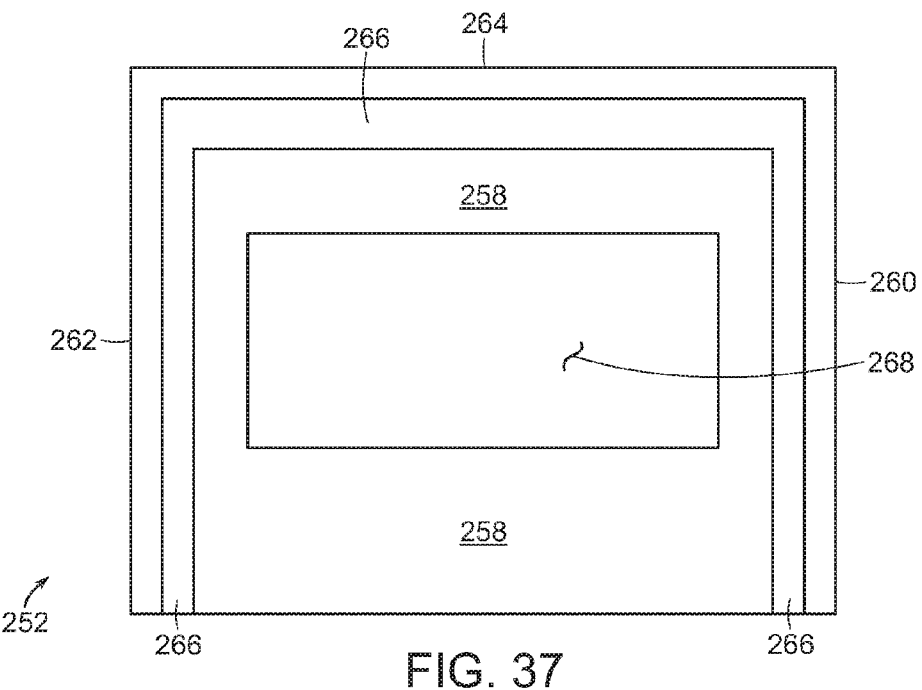
FIG. 37 is a rear view of the frame.
Figure 38:
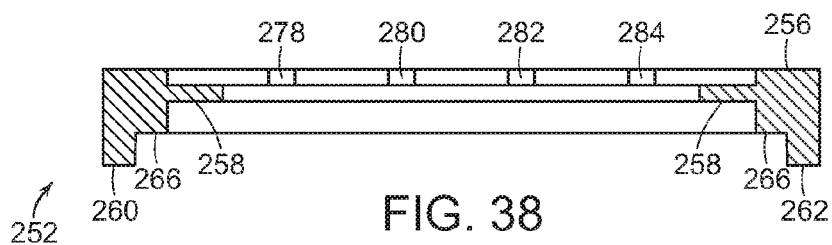
FIG. 38 is a cross section view of the frame taken along line 38-38 of FIG. 35.
Figure 39:
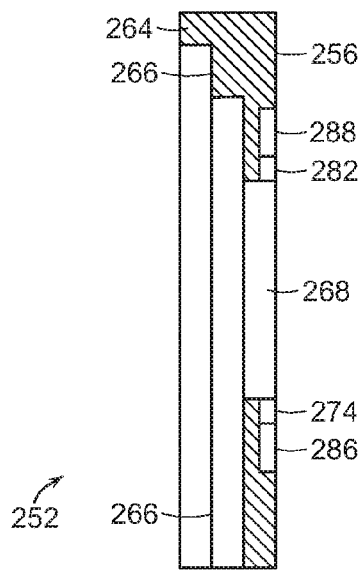
FIG. 39 is a cross-section view of the frame taken along line 39-39 of FIG. 35.

Referring to FIGS. 32-34, where a conductor panel assembly 250 is removably mounted to an open end of device 10 to provide electromagnetic transduction independent of the output from the piezoelectric materials. Conductor panel assembly 250 generally comprises a frame 252, helical wires 290, 292, 294, and 296 freely mounted to frame 252, and first and second conductors 302 and 304 electrically connected with helical wires 290, 292, 294, and 296 to provide a low impedance AC output. Movements of helical wires 290, 292, 294 and/or 296 within the static or changing magnetic fields of first and second magnets 108 and 110 (and the static magnetic field of fixed magnets 186 of composite structures 162, 164, 166, 168, 170, 172, 174, 176 and 178) induces a current into helical wires 290, 292, 294, and 296 that is output across first and second conductors 302 and 304.

Referring to FIGS. 35-39, frame 252 comprises a wall 254 having an outside surface 256 and an inside surface 258, a left side wall 260, a right side wall 262, and a top side wall 264. Frame 252 further comprises a boss 266 extending upward from inside surface 258 at the innermost end of left sidewall 260, right side wall 262, and top side wall 24. Frame 252 further comprises an opening 269 that in the embodiment is square shaped and sized to match the open face portion of device 10. Frame 252 further comprises a lower coil cavity 270, a lower coil cavity 272, a lower coil cavity 274, and a lower coil cavity 276. Frame 252 further comprises an upper coil cavity 278, upper coil cavity 280, an upper coil cavity 282, and an upper coil cavity 284. Frame 252 further comprises a lower conductor cavity 286 and a upper conductor cavity 288. Conductors 302 and 304 are secured within lower conductor cavity 286 and upper conductor cavity 288, respectively, by conventional means such as adhesive. End portions 298 and 300 of helical wire 290 are secured to lower and upper coil cavity 270 and 278, respectively, by conventional means such as adhesive. End portions 298 and 300 of helical wire 290 are electrically connected to first and second conductors 302 and 304 by conventional soldering operations. End portions 298 and 300 of helical wire 292 are secured to lower and upper coil cavity 272 and 280, respectively, by conventional means such as adhesive. End portions 298 and 230 of helical wire 292 are electrically connected to first and second conductors 302 and 304 by conventional soldering operations. End portions 298 and 300 of helical wire 294 are secured to lower and upper coil cavity 274 and 282, respectively, by conventional means such as adhesive. End portions 298 and 300 of helical wire 294 are electrically connected to first and second conductors 302 and 304 by conventional soldering operations. End portions 298 and 300 of helical wire 296 are secured to lower and upper coil cavity 274 and 284, respectively, by conventional means such as adhesive. End portions 298 and 300 of helical wire 296 are electrically connected to first and second conductors 302 and 304 by conventional soldering operations. Each of helical wires 290, 292, 294, and 296 may be any type of highly conductive wire or helical coil. For example, each of helical wires 290, 292, 294, and 296 may be copper micro coils having a thickness of 58 gauge and an outside diameter of about 1 mm available from Benatav Ltd., 16 Zvi-Bergman Street, Petach-Tikva, 4927973, Israel (www.benatay.com).

Device 10 may also include additional ways of harvesting energy using a piezoelectric blocks 180. Specifically, deflection of the two unfixed parts 90 and 92 of first and second mechanical springs 80 and 82, respectively, act as fixed-fixed spring beams upon which one or more piezoelectric blocks 180 may be attached.

The above description is intended primarily for purposes of illustration. This invention may be embodied in several other forms or carried out in other ways without departing from the spirit or scope of the invention. Modifications and variations still within the spirit or scope of the invention as claimed will be readily obvious to those of skill in the art.

What is claimed:

1. A device for harvesting energy comprising:
   a housing;
   a mechanical spring engaged with said housing between a static and dynamic state;
   a first magnet engaged with said mechanical spring;
   a grid engaged with said housing;
   a composite structure comprising a fixed magnet and a piezoelectric material; said composite structure is engaged with said grid and in communication with said first magnet; said first magnet and said fixed magnet apply a force upon said piezoelectric material when said mechanical spring is in said static state to produce a base voltage by a piezoelectric mode; and
   excitation of said mechanical spring causes said piezoelectric material to generate a first alternating voltage output comprising a first peak voltage by a piezoelectric mode greater than said base voltage by a piezoelectric mode.

2. The device of claim 1, wherein said first alternating voltage output comprises a wide bandwidth at said peak voltage.

3. The device of claim 2, wherein said wide bandwidth is greater than 50 Hz.

4. The device of claim 1, further comprising a second magnet secured to said mechanical spring; excitation of said mechanical spring causes said piezoelectric material to generate a second alternating voltage output that compares non-linearly to said first alternating voltage output at frequencies above 50 Hz.

5. The device of claim 1, wherein said housing comprises first, second, and third walls; said mechanical spring is engaged with said first and second walls.

6. The device of claim 5, wherein said grid is engaged with said third wall.

7. The device of claim 6, wherein said housing comprises a cavity; said grid is disposed in said cavity.

8. The device of claim 7, wherein said grid comprises a first cavity; said first composite structure is disposed in said first cavity of said grid.

9. The device of claim 8, wherein said housing is made from a material having a high Young modulus of elasticity and a high conductivity; and said grid is made from a material having a high Young modulus of elasticity and a high conductivity.

10. The device of claim 9, wherein said mechanical spring is removably engaged with said first and second walls of said housing.

11. The device of claim 10, wherein said mechanical spring comprises an elongated flexible member.

12. The device of claim 11, wherein said elongated flexible member comprises a centrally disposed mounting portion; said first magnet is engaged with said mounting portion; and said elongated flexible member comprises first and second side portions removably engaged with said first and second walls of said housing, respectively.

13. The device of claim 12, wherein said housing further comprises first and second channels engaged with said first and second walls, respectively; said first and second portions of said mechanical spring are removably engaged with said first and second channels, respectively.

14. The device of claim 13, wherein said first magnet has a magnetic field strength of about 1600 Gauss and said fixed magnet has a magnetic field strength of about 2900 Gauss.

15. The device of claim 14, wherein said grid is made from copper; said housing is made from copper; and said mechanical spring is made from stainless steel.

16. The device of claim 1, further comprising a conductor panel assembly engaged with said first, second, and third walls of said housing; said conductor panel assembly comprising a plurality of helical wires to collect dissipated magnetic energy from said first magnet and said fixed magnet to produce a voltage output by an electromagnetic transduction mode.

17. The device of claim 16, wherein said voltage output of said electromagnetic transduction mode is different from said alternating voltage output of said piezoelectric mode.

18. The device of claim 17, wherein said voltage output of said electromagnetic transduction mode is combined with said voltage output of said piezoelectric mode to boost electrical power.

19. A device for harvesting energy comprising:
a housing;
a first mechanical spring engaged with said housing;
a first magnet engaged with said first mechanical spring;
a first grid engaged with housing;
a first composite structure comprising a fixed magnet and a piezoelectric block; said first composite structure is engaged with said first grid and faces said first magnet; said first magnet and said fixed magnet apply a force upon said piezoelectric block when said first mechanical spring is in said static state to produce a first base voltage;
a second mechanical spring engaged with said housing;
a second magnet engaged with said second mechanical spring;
a second grid engaged with said housing;
a second composite structure comprising a fixed magnet and a piezoelectric block; said second composite structure is engaged with said second grid and faces said second magnet; said second magnet and said fixed magnet apply a force upon said piezoelectric block of said second composite structure when said second mechanical spring is in said static state to produce a second base voltage; and
excitation of said first mechanical spring causes said piezoelectric block of said first composite structure to generate an first alternating voltage output comprising a first peak voltage greater than said first base voltage; and excitation of said second mechanical spring causes said piezoelectric block of said second composite structure to generate an second alternating voltage output comprising a second peak voltage greater than said second base voltage.

20. The device of claim 19, wherein said second alternating voltage output further comprises a wide bandwidth at said second peak voltage.

21. The device of claim 20, wherein said wide bandwidth is greater than 50 Hz.

22. The device of claim 21, wherein said housing comprises first, second, third, and fourth walls; each of said first second mechanical springs are engaged with said first and second walls.

23. The device of claim 22, wherein each of said first and second grids are engaged with said third and forth walls, respectively.

24. The device of claim 23, wherein said housing comprises a first cavity and a second cavity engaged with said third and fourth walls, respectively; said first grid is disposed in said first cavity and said second grid is disposed in said second cavity.

25. The device of claim 24, wherein each of said first and second grids comprises a first cavity; said first composite structure is disposed in said first cavity of said first grid; and said second composite structure is disposed within said first cavity of said second grid.

26. The device of claim 25, wherein said housing is made from a material having a high Young modulus of elasticity and a high conductivity; and said first and second grids are made from a material having a high Young modulus of elasticity and a high conductivity.

27. The device of claim 26, wherein each of said first and second mechanical springs is removably engaged with said first and second walls of said housing; and each of said first and second mechanical springs comprise an elongated flexible member.

28. The device of claim 27, wherein said elongated flexible member of said first mechanical spring comprises a centrally disposed mounting portion; said first magnet is engaged with said mounting portion of said first mechanical spring; and said elongated flexible member of said second mechanical spring comprises a centrally disposed mounting portion; said second magnet is engaged with said mounting portion of said second mechanical spring.

29. The device of claim 28, wherein said elongated flexible member of said first mechanical spring comprises first and second side portions removably engaged with said first and second walls of said housing, respectively; and said elongated flexible member of said second mechanical spring comprises first and second side portions removably engaged with said first and second walls of said housing, respectively.

30. The device of claim 29, wherein said housing further comprises first and second lower channels engaged with said first and second walls, respectively; said housing further comprises first and second upper channels engaged with said first and second walls, respectively; said first and second portions of said first mechanical spring are removably engaged with said first and second lower channels, respectively; and said first and second portions of said second mechanical spring are removably engaged with said first and second upper channels, respectively.

31. The device of claim 30, wherein each of said first and second magnets has a magnetic field strength of about 1600 Gauss; and each of said fixed magnets has a magnetic field strength of about 2900 Gauss.

32. The device of claim 31, wherein said first and second grids are made from copper; said first and second housing are made from copper; and said first and second mechanical springs are made from stainless steel.

33. The device of claim 19, further comprising a conductor panel assembly engaged with said first, second, and third walls of said housing; said conductor panel assembly comprising a plurality of helical wires to collect dissipated magnetic energy from said first magnet and said fixed magnet and deliver it by an electromagnetic transduction mode.

\* \* \* \* \*